United States Patent [19]

Ishii et al.

[11] Patent Number: 5,379,153
[45] Date of Patent: Jan. 3, 1995

[54] RECORDING AND REPRODUCING APPARATUS HAVING PROGRAM INFORMATION

[75] Inventors: Toshiyuki Ishii; Kousuki Misono, both of Kanagawa; Miwako Tsuneki; Kiyoshi Ota, both of Tokyo; Tetsuo Nishigaki, Kanagawa, all of Japan

[73] Assignee: Sony Corporation, Tokyo, Japan

[21] Appl. No.: 644,294

[22] Filed: Jan. 18, 1991

[30] Foreign Application Priority Data

Jan. 21, 1990 [JP] Japan ................. 2-10865

[51] Int. Cl.$^5$ .............. G11B 5/02; G11B 27/36; G11B 15/12; G11B 15/18
[52] U.S. Cl. ................. 360/27; 360/31; 360/61; 360/62; 360/69; 360/74.4
[58] Field of Search ............ 360/27, 69, 74.4, 33.1, 360/32, 61, 62, 31

[56] References Cited

U.S. PATENT DOCUMENTS

| | | | |
|---|---|---|---|
| 4,206,483 | 6/1980 | Nakamura | 360/33.1 |
| 4,224,644 | 9/1980 | Lewis et al. | 360/74.4 |
| 4,439,785 | 3/1984 | Leonard | 360/27 |
| 4,750,052 | 6/1988 | Poppy et al. | 360/69 |
| 4,752,834 | 6/1988 | Koombes | 360/69 |
| 4,802,038 | 1/1989 | Oguro | 360/32 |
| 4,847,696 | 7/1989 | Matsumoto | 358/335 |
| 4,879,611 | 11/1989 | Fukui et al. | 360/69 |
| 4,977,455 | 12/1990 | Young | 360/69 |
| 5,117,316 | 5/1992 | Kim | 360/69 |

FOREIGN PATENT DOCUMENTS

| | | |
|---|---|---|
| 0115145 | 8/1984 | European Pat. Off. |
| 2186136 | 8/1987 | United Kingdom |
| 2193403 | 2/1988 | United Kingdom |
| 2208142 | 3/1989 | United Kingdom |

Primary Examiner—Timothy P. Callahan
Assistant Examiner—Trong Phan
Attorney, Agent, or Firm—William S. Frommer; Alvin Sinderbrand

[57] ABSTRACT

Apparatus is provided for recording on and reproducing from a record medium events supplied at particular times from at least one source, as well as preset data selectively input by a user to establish an event to be recorded and the time of recording that event. Preset data to select source, time and duration of events to be recorded on the record medium are selectively input and stored in a temporary storage device for recording on the record medium. A display operates to display preset data stored in the storage device and is controlled to provide indications of events to be (and that may have been) recorded.

30 Claims, 26 Drawing Sheets

| ITEM | CONTENTS | NUMBER OF BYTES | |
|---|---|---|---|
| A 1 | FORMAT VERSION | 1 | |
| A 2 | NUMBER OF RECORDING TIMES REPEATED | 1 | |
| A 3 | NUMBER OF PICTURES USED | 1 | |
| A 4 | NUMBER OF PROGRAMS USED | 1 | ~$D_{VMX}$ |
| A 5 | CREATING DATE | 5 | |
| A 6 | UPDATING DATE | 5 | |
| A 7 | SYSTEM VOLUME NUMBER | 8 | |
| A 8 | SCREEN DISPLAYING COLOR | 2 | |
| A 9 | VARIOUS FLAGS | 1 | |
| A 10 | TYPE OF VIDEO CASSETTE | 2 | |
| A 11 | PASSWORD | 2 | |
| A 12 | USER VOLUME NUMBER | 2 | |
| A 13 | REPRODUCING ORDER | 32 | |
| A 14 | RECORDING ORDER | 32 | |
| A 15 | VOLUME LABEL | 40 | |

FIG. 5

| ITEM | CONTENTS | NUMBER OF BYTES |
|---|---|---|
| B 1 | STARTING ADDRESS | 3 |
| B 2 | ENDING ADDRESS | 3 |
| B 3 | VARIOUS FLAGS | 1 |
| B 4 | SYSTEM PROGRAM NUMBER | 1 |
| B 5 | PROGRAM NUMBER | 1 |
| B 6 | CATEGORY CODE | 1 |
| B 7 | INPUT SOURCE | 1 |
| B 8 | RECORDING/OPERATION MODE | 1 |
| B 9 | RECORDING STARTING TIME | 5 |
| B 10 | RECORDING ENDING TIME | 2 |
| B 11 | PRESET PROGRAM RECORDING CONTROL INFORMATION | 10 |
| B 12 | TITLE | 40 |

$D_{PRX}$

FIG. 6

| TBL | | | | | | | | | |
|---|---|---|---|---|---|---|---|---|---|
| TODAY | TOMORROW | DAY AFTER TOMORROW | MONTH | 1 | 2 | 3 | 0 | BS | DISPLAY | STOP... |
| NEXT WEEK | EVERY WEEK | EVERY DAY | DAY | 4 | 5 | 6 | β II | LNIE | CHANGE | CALENDER |
| SUNDAY | MONDAY | TUESDAY | IN THE MORNING | 7 | 8 | 9 | O'CLOCK | CABLE | CANCEL | . |
| WEDNESDAY | THURSDAY | FRIDAY | IN THE AFTERNOON | 10 | 11 | 12 | MINUTE | ch | CONTINUE TILL | RECORD PRESETTING |
| SATURDAY | FROM | UNTIL | THE PRO-GRAM OF | OF | AT | TO | BETWEEN | YES | NO | END |

FIG. 11

RECORDING
TIME OVERLAP

RECORDING
TIME COINCIDENCE

RECORDING
TIME OVERLAP

RECORDING
TIME COINCIDENCE

RECORDING AND REPRODUCING APPARATUS HAVING PROGRAM INFORMATION

BACKGROUND OF THE INVENTION

This invention relates to recording and reproducing apparatus for recording and playing back information relating to entertainment programs and, more particularly, to an improvement of such apparatus in which information concerning programs on television, radio, or the like may be preset by a user.

A programmable tape recorder is described in U.S. Pat. No. 4,224,644.

Conventional electronic devices for consumer use, for example, video tape recorders, audio cassette recorders and the like, are provided with programming timers which are useful in recording at least one entertainment program that may be broadcast in the future. More advanced programming apparatus are known to execute more sophisticated functions using preset program information that may be selected by the user.

In video tape recorders of the above-described type which can be preprogrammed to record a large number of entertainment programs (referred to as "events"), it is impossible to record a plurality of events that occur in the same time zone (e.g. that contain portions which coexist simultaneously. However, when the user programs the recorder to record a large number of events, he may mistakenly attempt to preset the recorder to record a plurality of events which will, nevertheless, be present during the same time zone. In that case, even when one of these events is of great importance to the user, if a selected event of lesser importance is present (and, thus, will be in the process of being recorded) before the start of the more important event, the latter will not be recorded. At best, only partial recording of the important event will be possible.

Moreover, in a video tape recorder of the above-described type, when information concerning the preset events is to be displayed, changed or canceled, data representing that information, such as date, time and channel of broadcast (referred to as preset data) generally is displayed on a display screen in the form of characters, numbers or symbols which may not be readily understood by the user. This difficulty is exacerbated when the number of programming functions and options increases because this causes the amount and type of preset data to increase.

Furthermore, in a video tape recorder of the above-described type which is capable of being preset or programmed to record a large number of events, when information representing the preset events (i.e. the preset data) is to be reviewed, checked, changed or canceled, the preset data normally is displayed on a monitor. However, display of all the information included in the preset data makes it difficult for the user to understand and fully appreciate just what is being displayed.

In a video tape recorder having event-programmable capability, when the user programs the recorder to record events or when the user checks the preset data relating to events to be recorded, it is convenient to display to the user a calendar during the presetting operation.

SUMMARY OF THE INVENTION

In view of the foregoing, an object of this invention is to provide recording and reproducing apparatus programmable with a large variety of multipurpose information to preset the recording of various events in a manner that is more convenient to the user.

Another object of the invention is to provide recording and reproducing apparatus which prevents the presetting thereof for the recording of plural future events that will be temporally present at the same time (i.e. during the same time zone).

A further object of the invention is to provide recording and reproducing apparatus in which preset data that describes events to be recorded may be displayed and discerned accurately by a user.

An additional object of the invention is to provide recording and reproducing apparatus which displays preset data of the aforementioned type relating to events having recording times within a desired range.

Still another object of the invention is to provide recording and reproducing apparatus in which a calendar is displayed on the display screen of a monitor.

In accordance with this invention, apparatus is provided for recording on and reproducing from a record medium events supplied at particular times from at least one source, as well as preset data selectively input by a user to establish an event to be recorded and the time of recording that event. Preset data to select source, time and duration of events to be recorded on the record medium are selectively input and stored in a temporary storage device for recording on the record medium. The storage device also is adapted to store preset data reproduced from the record medium. A display operates to display preset data stored in the storage device and is controlled to provide indications of events to be (and that have been) recorded.

As one feature of this invention, preset data representing time and duration of events which have already been selected for recording (known as "already preset data") are displayed on a first time zone and preset data representing time and duration of events which are in the process of being selected for recording (known as "currently preset data") are displayed on a second time zone. These time zones are aligned on the display to provide temporal overlays of already preset events and currently preset events.

As another feature, the aforementioned preset data are displayed in a two-dimensional display array comprised of orthogonal time zones, one of which indicates the weeks of a month while the other indicates the days of a week, or one of which indicates the days of a week and the other indicates the hours of a day, or one of which indicates A.M. and P.M. and the other indicates hours. Indicia of recording times and durations of events selected for recording are displayed only a predetermined one of these time zones.

As an additional feature of this invention, select data is produced to represent particular information included in the preset data. Preset data that is stored in the storage device and that includes this particular information is retrieved and displayed in tabulated form.

In accordance with a further feature, preset data is displayed in a particular one of several display formats selectable by the user, including a one-month calendar format formed of portions of successive months which indicate those days on which events have been selected by the user for recording.

BRIEF DESCRIPTION OF THE DRAWINGS

The following detailed description, given by way of example and not intended to limit the present invention solely thereto will best be understood in conjunction with the accompanying drawings in which:

FIGS. 4 to 6 represent the configuration of preset data included in a management data base of information related to the recording of events;

FIG. 11 illustrates a table of selectable items that may be used to program the video tape recorder and to process the management data base;

DETAILED DESCRIPTION OF CERTAIN PREFERRED EMBODIMENTS

Figure 1A:
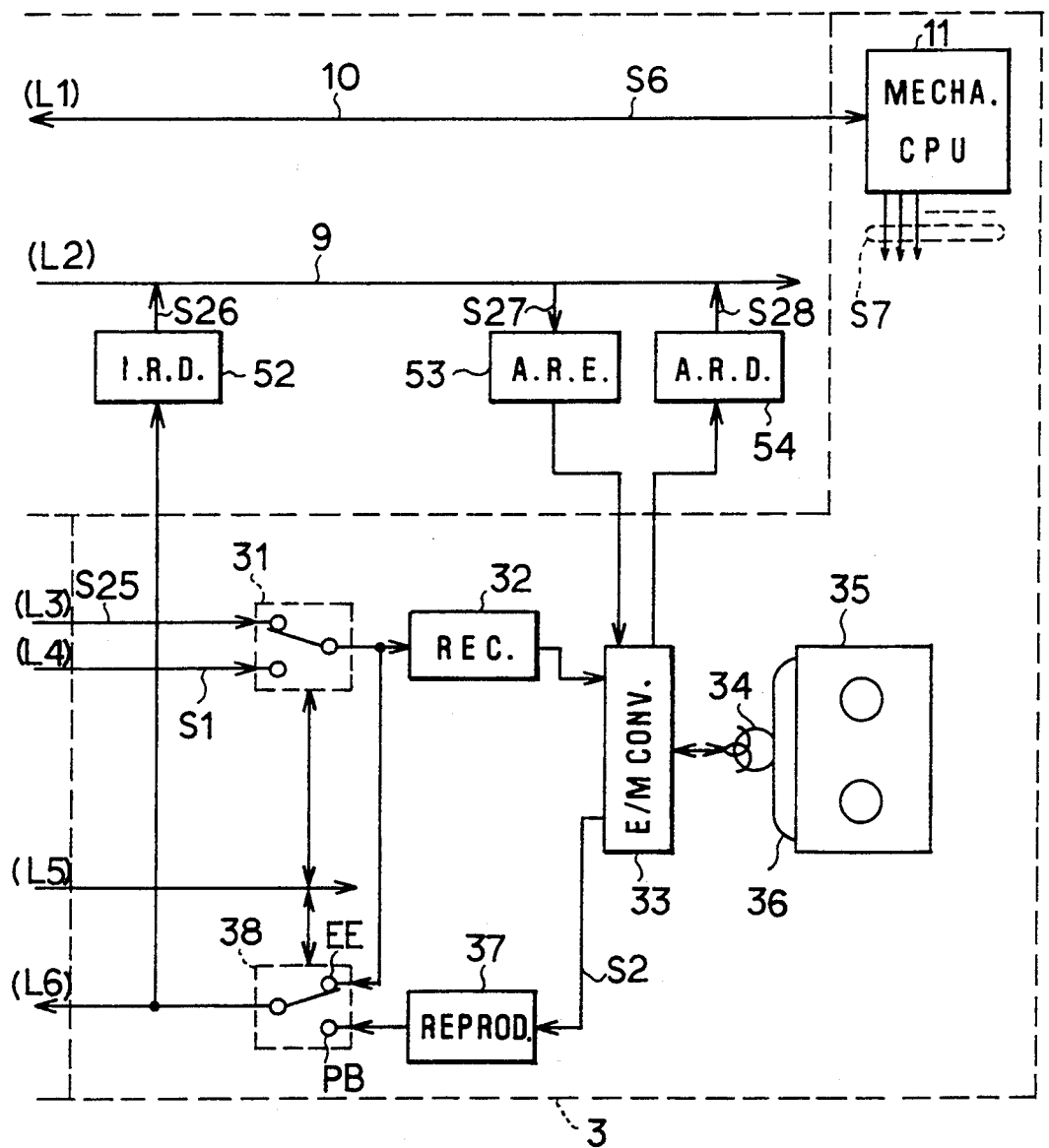
FIGS. 1A and 1B comprise a block diagram of a video tape recorder which includes a programming device according to the present invention.
Figure 1B:
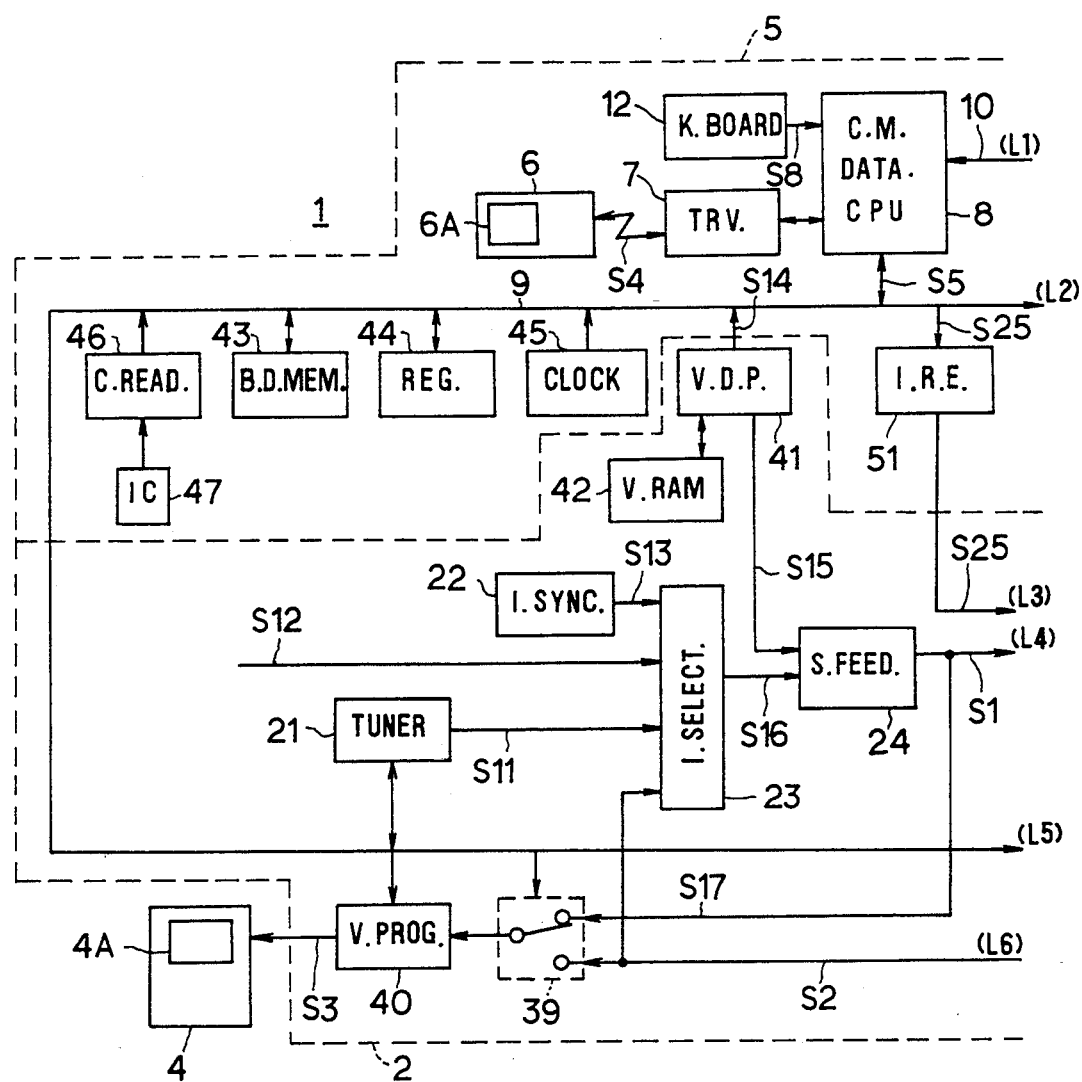

A video tape recorder 1 is illustrated in FIGS. 1A–1B for recording a video signal S1 supplied to a video tape recorder unit 3 (FIG. 1A) through a video signal processing unit 2 (FIG. 1B). The video recorder is adapted to reproduce a video signal S2 which then is supplied through video signal processing unit 2 to a monitor 4 as a video signal S3.

A control and management data processing unit 5 receives an input/output information signal S4 from a remote controller 6 via a remote control transceiver 7. This signal S4 is fed to a central processing unit (CPU) 8 which supplies control information S5 to a bus 9 to control the circuit elements included in video signal processing unit 2 and video tape recorder unit 3 for recording and playing back information. CPU 8 also exchanges control information S6 with a mechanism controlling central processing unit (CPU) 11 of the video tape recorder unit 3 (FIG. 1A). CPU 11 supplies a control signal S7 to the elements which comprise video tape recorder unit 3.

Video signal processing unit 2 is adapted to process video information signal S11 received by a tuner 21, a video information signals S12 supplied from an external video signal source, and a synchronizing signal S13 generated by an internal synchronizing circuit 22. The video information signals may be thought of as event signals because they comprise, for example, television program signals. Signals S11–S13 are input to a superimposed feeder circuit 24 through an input selecting circuit 23 to generate the video signal S1 at the output terminal of the superimposed feeder circuit for recording. The video signal S1 is supplied to a recording circuit 32 through a recording switchover circuit 31 (FIG. 1A) and is applied to a conventional electromagnetic converting circuit 33 for magnetic recording on a video tape 36 of a video cassette 35 by means of a magnetic head 34.

In the reproducing mode, the video signal that had been recorded on video tape 36 is supplied to a reproducing switchover circuit 38 through magnetic head 34, converting circuit 33 and a reproducing circuit 37. The played back signal is coupled to video signal processing unit 2 as the reproduced video signal S2. This signal S2 is applied to a video processing circuit 40 through an output selecting circuit 39. The video processing circuit generates a video output signal S3 that is displayed on a display screen 4A of monitor 4.

CPU 8 of the control management data processing unit 5 is adapted to process certain fixed data, such as operating system data stored in a data memory 43 which, preferably, comprises a ROM. CPU 8 also processes data stored in a register 44 which may be a RAM, that is derived from the information signal S4 received from remote controller 6. In addition, the CPU processes an information signal S8 supplied form a VTR keyboard 12. A clock signal generated by a clock circuit 45 is used by the CPU to process the data supplied thereto; and the data produced by the CPU is applied to buses 9 and 10 as control information S5 and S6. In the illustrated embodiment, a card reader 45 is connected to bus 9 to read fixed data (such as operating control data) from an IC card 47 to register 44 from which this data is fetched by CPU 8.

CPU 8 is operative to supply a portion of the control information S5 to a video display processor 41 included in video signal processing unit 2 as an image display information signal S14. Upon receipt of this image display information signal S14, the video display processor reads out an image display signal S15 from a video RAM 42 and supplies the image display signal to the superimposed feeder circuit 24 which superimposes the image display signal S15 onto the video signal S16 supplied from input selecting circuit 23 (i.e. the image display signal is superimposed onto the received television signal). The resultant superimposed output signal S17 is supplied from feeder circuit 24 to video processing circuit 40 through output selecting circuit 39 to display on display screen 4A an image on which characters or diagrams are superimposed onto a video picture for interaction with the user. As will be described, the superimposed image comprises information relating to events that have been (or are in the process of being) preset for recording. When this image information from image display signal S5 is displayed on display screen 4A, CPU 8 supplies an image signal S4 representing the same image to remote controller 6 through transceiver 7 to display on a display screen 6A of the remote controller the same image as that displayed on the display screen 4A.

CPU 8 supplies to a video track recording encoder 51 a portion of control information S5 as recording management data S25. This recording management data is related to the recording and reproducing operation of video tape recorder unit 3 and is supplied through recording switch-over circuit 31, recording circuit 32 and converting circuit 33 for recording in a video recording track of video tape 36. CPU 8 also is adapted to retrieve management data that had been recorded in a video recording track of the video tape. This management data (as distinguished from video information signals) is played back through converting circuit 33, reproducing circuit 37, reproduction switch-over circuit 38 and a video track decoder 52 to bus 9 as read-out management data S26. CPU 8 alternatively supplies to an audio track encoder 53 (FIG. 1A) recording management data S27 which is similar to the recording management data S25. The management data supplied to the audio track encoder is recorded in an audio recording track of video tape 36 by means of converting circuit 33 and magnetic head 34. In a reproducing mode, CPU 8 reads out the management data recorded in an audio track via an audio track decoder 54 as read-out management data S28.

Figure 2:
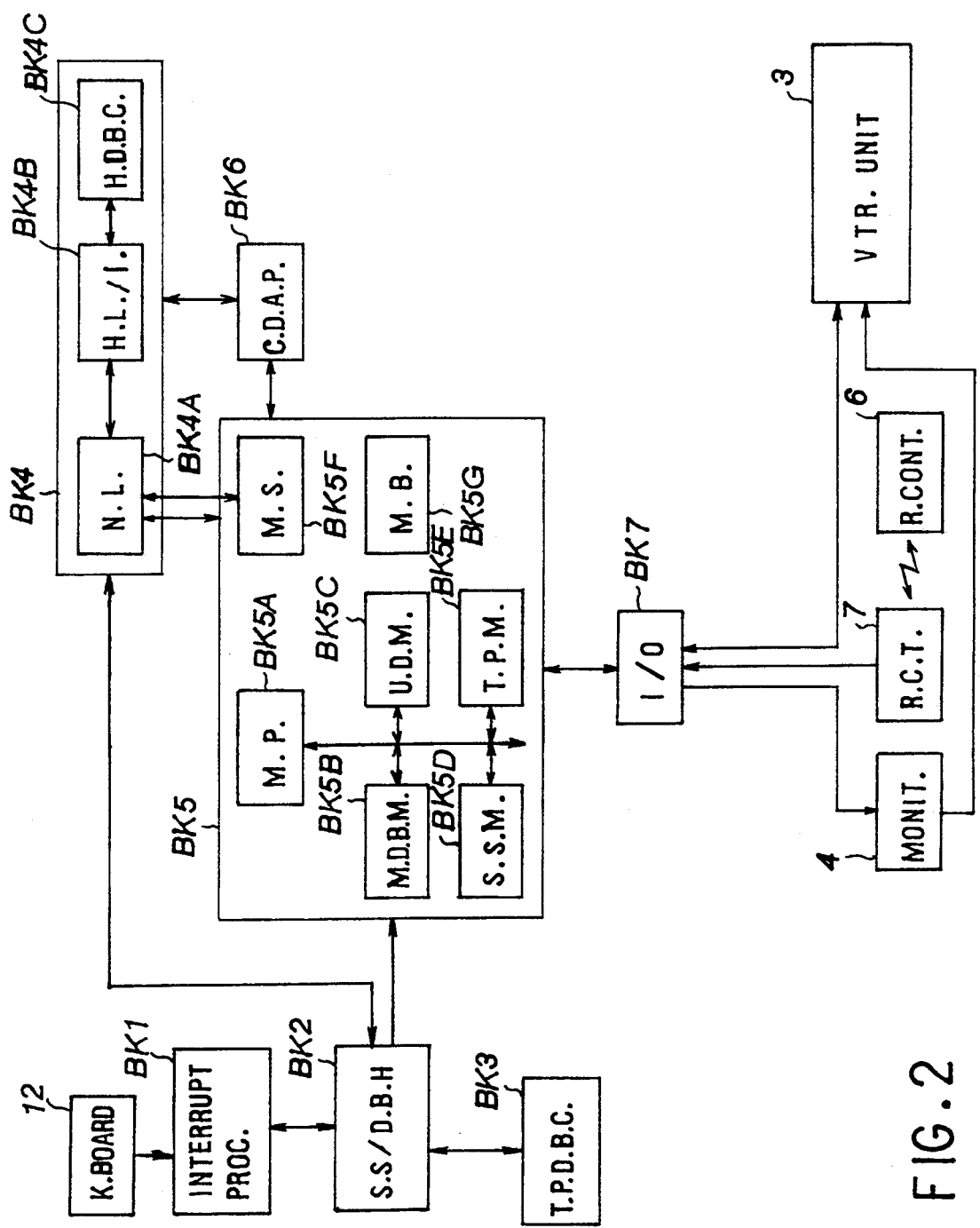
FIG. 2 is a block diagram representing some of the of functional blocks of the video tape recorder of FIG. 1.

CPU 8 is adapted to control the video tape recorder by assuming various operating functions in accordance with the functional blocks shown in FIG. 2. These functional blocks merely are schematic representations of the operative modes of the CPU, and the following brief discussion is not intended to be an explanation of the operation of the CPU or of the present invention. For example, upon receipt of a command from keyboard 12, the CPU functions as an interrupt means (represented by block BK1), and then functions as a system schedule means and a data base holding means (represented by block BK2). The system schedule means and the data base holding means communicate with a data base creating means indicated by block BK3 to execute the functions of an artificial intelligence module indicated by block BK4 and also to execute the functions of an application means indicated by block BK5 while managing the timing of the system.

As the artificial intelligence module BK4, CPU 8 functions as a natural language system BK4A to determine the contents of a natural language command input signal. The CPU also functions as a habit learning and inferring system BK4B to learn and infer the habit of the user based upon the contents of the natural language command input signal, and functions as a habit data base creating system BK4C to create a habit data base.

As the application means BK5, CPU 8 acts as a module processing means BK5A to execute the functions of a management data base module BK5B, a user's desired module BK5C, a system setting module BK5D and a timer presetting module BK5E. At the same time, the CPU acts as a message system BK5F to display a message and as a monitor block BK5G to display information on monitor 4.

To process the functions carried out by the artificial intelligence module BK4 and by the application means BK5, the CPU 8 functions as a common data area processing block BK6 to process time presetting packets or flags.

The application means BK5 is connected to video tape recorder unit 3, monitor 4, remote control transceiver 7 and remote controller 6, which are external devices, through an input/output driving means BK7.

Figure 3:
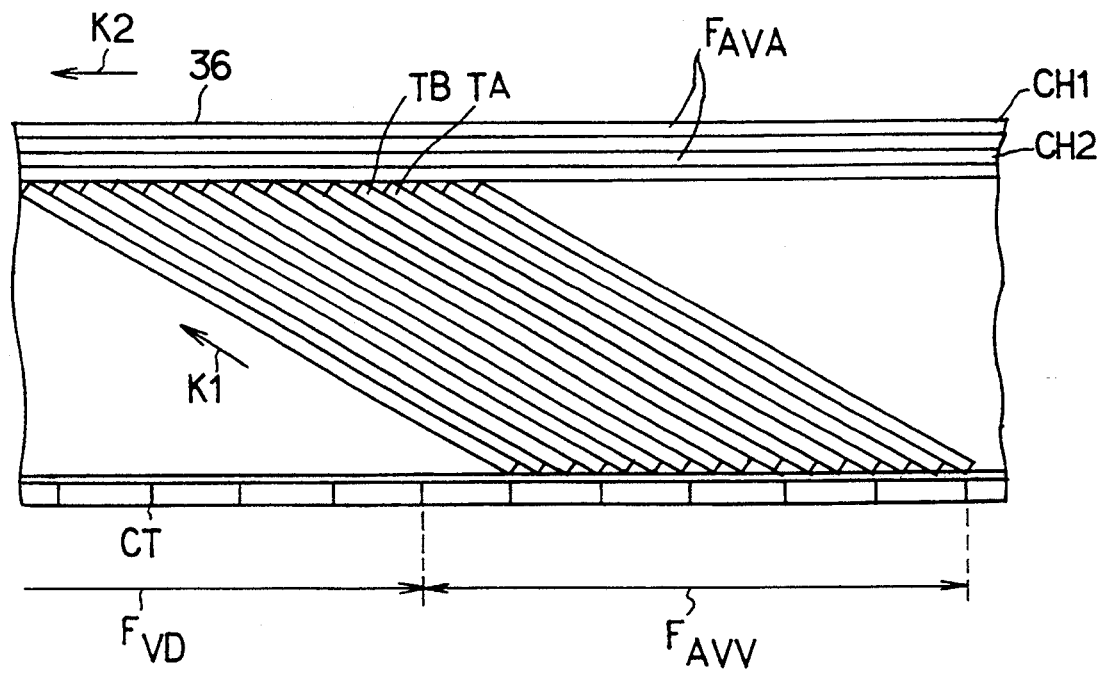
FIG. 3 is a schematic diagram of the recording format of a video tape.

Video tape 36 is illustrated in FIG. 3 as having successive video recording tracks TA and TB, which are recorded by respective heads having different azimuths and which run in the head scanning direction K1 diagonally to the tape traveling direction K2. A control signal CT is recorded along the longitudinal edge portion of the video tape where the video tracks TA and TB begin; and audio recording tracks CH1 and CH2 are recorded along the longitudinal edge portion of the video tape where the video tracks end. The management data produced by CPU 8 and described briefly above is recorded in a predetermined number of video recording tracks TA and TB at the beginning of the video tape to form a management data base area $F_{AVV}$. That portion of the video tape which follows the management data base area $F_{AVV}$ comprises a video signal recording area $F_{VD}$ in which the usual video signals representing picture information (e.g. event information) are recorded. Alternatively, the management data may be recorded in one or both audio tracks to form a management data base area $F_{AVA}$.

Figure 4:
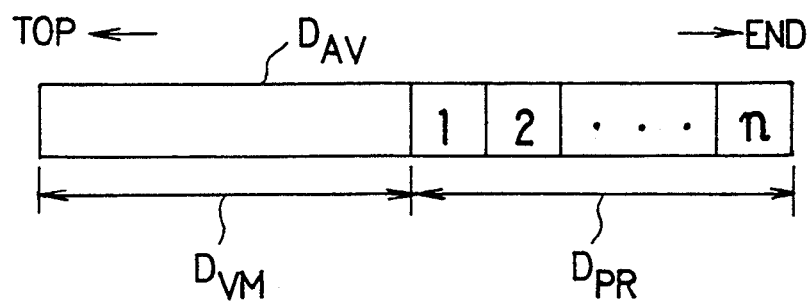

The management data recorded in the tracks of the management data base area exhibits the configuration $D_{AV}$ shown in FIG. 4. The management data $D_{AV}$ is formed of a volume information block $D_{VM}$ and a program information block $D_{PR}$ which may be recorded in the illustrated or in reverse order. The volume information block $D_{VM}$ consists of management data that represents management information on the particular video cassette 35 that is mounted in video tape recorder unit 3. For example, the volume information block comprises a block of 135 bytes $D_{VMX}$ formed of items A1 to A15, as shown in FIG. 5, representing details concerning the recording format convention and the history of the video tape but do not represent details concerning each event that has been or will be recorded.

Item A1, designated "format version", in FIG. 5, is 1-byte data which represents the version number of the management data $D_{VA}$. Recording of the version number enables the format version of the video cassette to be identified and this allows CPU 8 to operate compatibly with this format such that management data $D_{AV}$ of an old version or a new version is processed accordingly.

Item A2, designated "number of recording times repeated", is a 1-byte data and is used when management data is recorded in the audio tracks. A2 represents the number of times the management data $D_{AV}$ is recorded in the management data base recording area $F_{AVA}$.

Item A3, designated "number of pictures used", is 1-byte data which represents the number of video tracks that are used to record the management data $D_{AV}$. A3 enables the starting track of the video signal recording area $F_{VD}$ to be determined easily.

Item A4, designated "number of programs used", is 1-byte data which represents the number of events (e.g. television programs) that have been preset for recording. A4 is useful in determining the availability of recording space on the video tape. In one embodiment, the 0th to 6th bits represent the number of events that have been preset for recording (as an example, recording of a maximum of 32 events may be permitted). The 7th bit represents the presence (represented by a logical value "0") or absence (represented by a logical value "1") of recording space for the recording of additional events and allows the absence of recording space to be sensed easily when the number of preset events is less than the maximum number 32 (for example, if the total recording time that will be consumed by the preset events approaches the capacity of the video tape).

Item A5, designated "creating date", is 5-byte data which represents the date on which the management data $D_{AV}$ is initially written on the video tape. In one embodiment, the 1st, 2nd, 3rd, 4th and 5th bytes are respectively 2-digit binary-coded decimal numbers which represent "minute", "hour", "day", "month" and "year". A5 is indicative of the age of the video cassette.

Item A6, designated "updating date", is 5-byte data which represents the last date on which the management data $D_{AV}$ was updated. In one embodiment, the 1st, 2nd, 3rd, 4th and 5th bytes are respectively 2-digit binary-coded decimal numbers which represent "minute", "hour", "day", "month" and "year". A6 is indicative of when the version of the management data $D_{AV}$ present on the tape was created.

Item A7, designated "system volume number", is 8-byte data which represents the number of versions that have been developed for volume information block $D_{VM}$ (e.g. is this version 1, version 2, etc.). A7 allows the user to determine whether the volume information block has been revised and, if so, to check its version number in the series of revisions. The system volume number may be pre-recorded on the video tape and can be displayed on monitor 4 in order to apprise the user of the version of the cassette on which a preset program is recorded.

Item A8, designated "screen displaying color" is 2-byte data which represents the color that is used to display a list of useful information. If different colors are used with different cassettes, A8 allows the user to determine which cassette is loaded into the recorder simply from the color in which the list is displayed.

Item A9, designated "various types of flags" is 1-byte data which represents a plurality of flags. For example, the 0th bit represents a "recording inhibiting" flag that may be set by the user and allows the contents of the video cassette 35 to be preserved (i.e. re-recording is inhibited). The 1st bit represents a "formatted" flag that may be supplied automatically by the system and allows the user to determine whether the entire recording area of the video tape has been properly formatted. The 2nd and 3rd bits of A9 represent an "address mode" flag that may be furnished automatically by the system and represents the type of program ending address.

Item A10, designated "type of video cassette" is 2-byte data which represents the length and type of the tape. The 1st byte can be set automatically by the system whereas the 2nd byte is set at the user's option. A10 is indicative of the tape hub diameter used.

Item A11, designated "password" is 2-byte data which represents a password, such as a 4-digit binary-coded decimal number which may be selected by the user. Once the password has been recorded on the video cassette as part of the management data, the user must enter the same password to enable recording on as well as reproducing from that video cassette.

Item A12, designated "user volume number", is 2-byte data which represents the video cassette reference number, i.e., the volume number, that may be recorded on video cassette 35 by the user. In one embodiment, the range of volume numbers that can be recorded is between 0 and 64000 in binary-coded decimal notation. When the user volume number is included in the recorded management data base, it may be displayed on the monitor to inform the user accordingly.

Item A13, designated "reproducing order", is 32-byte data that represents the order in which up to 32 recorded events are to be reproduced. A13 allows a maximum of 32 events to be reproduced in a desired sequence beginning with the event represented by the 1st byte.

Item A14, designated "recording order", is 32-byte data that represents the order in which up to 32 events have been recorded. The user may wish to view these events in a different order from that in which they were recorded.

Item A15, designated "volume label", is 40-byte data which represents a label, such as a title, that can be recorded on the video cassette 35 by the user. When the volume label is included in the recorded management data base, it can be displayed on the monitor to inform the user of the particular cassette that is present in the video recorder and on which a preset event will be recorded. In this embodiment, a maximum of 40 characters may be recorded using ASCII code. In a case where S-J1S code is used, a maximum of 20 characters can be recorded.

The program information block $D_{PR}$ (FIG. 4) represents information relating to the particular events that have been or will be recorded on video tape 36 of video cassette 35. As one example, the program information block $D_{PR}$ may take the form of a 69-byte block $D_{PRX}$ comprised of items B1-B12, as shown in FIG. 6. Item B1, designated "starting address", is comprised of a multiple of 3-byte data which represent the starting addresses of the events that are recorded by the system after those programs have been recorded on the video signal recording area $F_{VD}$ of the video cassette 35. In this embodiment, the time mode (including "second", "minute", and "hour" represented in binary-coded decimal notation), the program number mode (represented by the program number in conformity with VASS (VHS) or video address signal search (VHS), standards), and the control signal mode (represented by the number of CTL pulses in conformity with the CTL ($\beta$) standard) may be selectively employed as the address mode.

Item B2, designated "ending address" is comprised of multiple 3-byte data which represent the ending addresses of the events that are recorded on the video tape. Similar to the program starting address B1, the time mode, the program number mode and the control signal mode may be selected as the program ending address.

Item B3, designated "various flags", is 1-byte data which represents information on the status of event handling. For example, the 0th bit represents whether a program has been or has not yet been recorded completely. The 1st and 2nd bits represent recording completion status information and indicate the status in which recording is completed. For example, the status represented by these bits may be as follows:

| Bit 2 | Bit 1 | Status |
| --- | --- | --- |
| 0 | 0 | recording is completed |
| 0 | 1 | tape trouble |
| 1 | 0 | power supply trouble |
| 1 | 1 | reserved |

The 3rd bit is a recording permission flag which indicates whether or not recording is prohibited. The 4th bit is a viewed flag which indicates whether or not the user has viewed the recorded event.

Item B4, designated "system program number", is 1-byte data which represents a series of reference numbers that are assigned to the events by the system.

Item B5 designated "program number", is 1-byte data which represents the number of times a serial event (for example, a daily drama) has been selected for recording by the user.

Item B6, designated "category code", is 1-byte data which represents the category of the selected event (for example, sports, news, drama, etc.).

Item B7, designated "input source", is 1-byte data which represents the source from which the event is to be recorded. This source may comprise the broadcast channel number selected by tuner 21 (FIG. 1B) or the external line number from which the external line video signal S12 is supplied.

Item B8, designated "recording/operation mode", is 1-byte data which represents the recording mode by which video signals are recorded on video cassette 35 and the operation mode in which those video signals are recorded. For example, when β-recording is used, the recording mode may be "βI mode", "βII mode" or "βIII mode". Similarly, if VHS-recording is used, the recording mode may be "SP mode", "LP mode" or "EP mode". Likewise, if the 8 mm format is used for recording, the recording mode may be "SP mode" or "LP mode". The operation mode in which video signals are recorded may be "normal recording mode", "reference signal writing mode" or the like.

Item B9, designated "recording starting time", is 5-byte data which represents the starting time of the event to be (or which already may have been) recorded. The 1st, 2nd, 3rd, 4th and 5th bytes may be binary-coded decimal numbers which represent "minute", "hour", "day" "month" and "year", respectively. Typically, the recording start time is selected by the user.

Item B10, designated "recording ending time", is 2-byte data which represents the ending time of the event to be (or which already may have been) recorded. The 1st and 2nd bytes may be binary-coded decimal numbers which represent "minute" and "hour", respectively.

Item B11, designated "preset program recording control information", is 10-byte data which represents typical format information needed to operate video tape recorder unit 3 (FIG. 1A) to record a preset event and to control peripheral devices to view or receive that event.

Item B12, designated "title" is 40-byte data which represents characters selected by the user as the title of the event to be recorded (i.e. the title of the preset event).

CPU 8 controls control and management data processing unit 5, video signal processing unit 2 and video tape recorder unit 3 in response to user-generated commands supplied from remote controller 6 or from keyboard 12. Such CPU control is carried out by the routines RT0, RT1 and RT31 shown as the flow charts in FIGS. 7, 8 and 9, to be described. One embodiment of remote controller 6 is illustrated in FIG. 10 as having display screen 6A adapted to display a list of items for interaction with the user. Display screen 6A preferably is comprised of a liquid crystal display overlaid with a touch-sensitive panel. User responses, such as the selection of times that are displayed, are signalled when the user touches that portion of the display screen whereat a desired item is displayed. Alternatively, an item selection signal may be generated when the user moves a cursor displayed on display screen 6A to a desired item, such as by operating a four-direction cursor key 6B, and then operating an execution (or "enter") key 6C. Remote controller 6 also includes a normal operation command key 6D, a menu display key 6E, a management data mode command key 6F, and two programming operation mode selection keys 6G and 6H. The user may select a particular operation mode for video tape recorder 1 by pressing one of these operation mode selection keys.

Figure 7A:
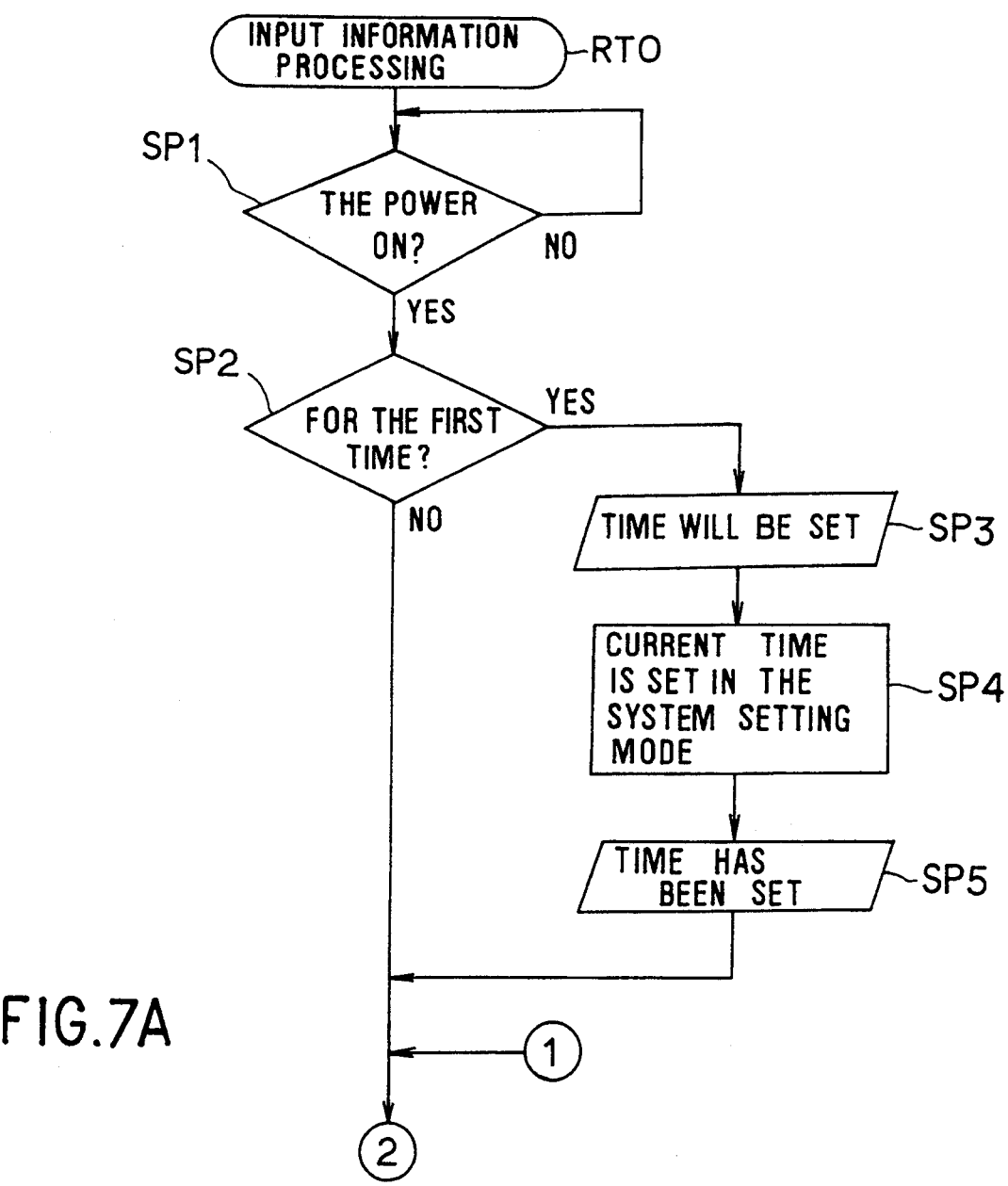
FIGS. 7A and 7B comprise a flow chart of the procedure by which the video tape recorder is programmed with preset data.
Figure 7B:
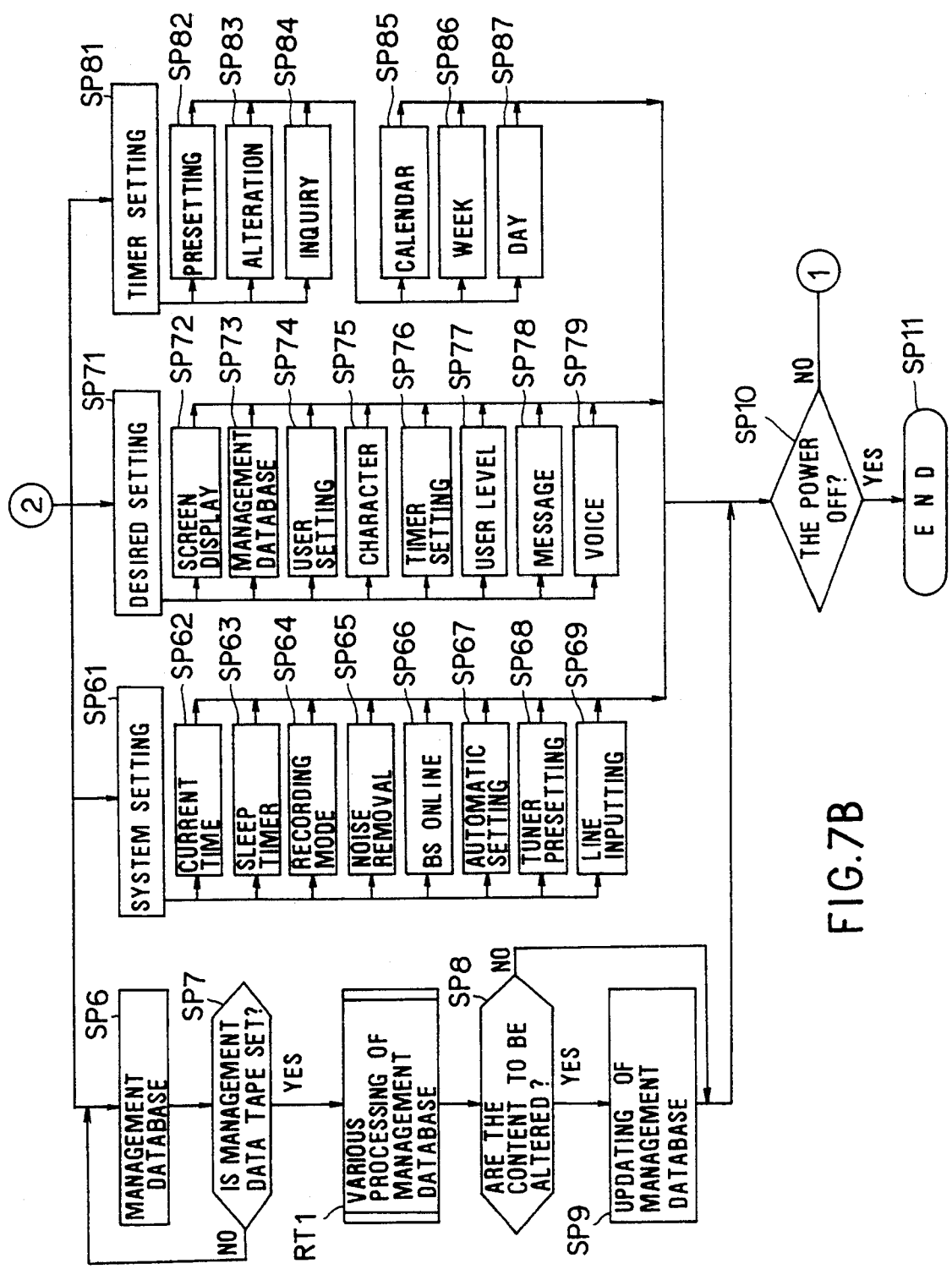

Turning now to CPU control over the video tape recorder unit, the video signal processing unit and the control and management data processing unit, reference is made to FIG. 7 (shown as FIGS. 7A and 7B) which illustrates the flow chart of input information processing routine RT0. Initially, CPU 8 inquires at SP1 if power is supplied to the apparatus. If the answer is affirmative, the routine inquires at SP2 if the power has been turned on for the first time. If so, the CPU advances to instructions SP3, SP4 and SP5 to display the message "TIME WILL BE SET" on display screen 4A of monitor 4 as well as on display screen 6A of remote controller 6, to enter a time-setting subroutine so as to set the current time into the system, and then to display the message "TIME HAS BEEN SET" on display screens 4A and 6A. The time-setting operation is not important to the present invention and is not described. Once the current time has been set in the video tape recorder, CPU 8 enters a wait state to await the next input command.

If the answer to inquiry SP2 is negative, the routine enters the wait state directly. While in this wait state, the CPU awaits commands to enter of the following subroutines: "MANAGEMENT DATA BASE", "SYSTEM SETTING", "DESIRED SETTING" and "TIMER SETTING". CPU 8 may enter this wait state in response to user actuation of menu display key 6E (or a comparable key on keyboard 12). In any event, once in this wait state, the CPU causes the display of a menu or list of operation modes which include the subroutines "MANAGEMENT DATA BASE", "SYSTEM SETTING", "DESIRED SETTING" and "TIMER SETTING". The user may select one of these subroutines by touching the display screen.

The "MANAGEMENT DATA BASE" subroutine initiates the operation mode in which the management data $D_{AV}$ (comprised of volume information $D_{VM}$ and event information $D_{PR}$ of FIG. 4) is recorded either on the management data base recording area $F_{AVV}$ or the management data base recording are $F_{AVA}$ of the video tape (FIG. 3) as may be selected. The MANAGEMENT DATA BASE subroutine also initiates control over video tape recorder unit 3 as established by the volume and event information of the management data $D_{AV}$ that has been recorded on the video tape. If "MANAGEMENT DATA BASE" is selected by the user from the displayed menu, as represented by step SP6 of FIG. 7B, the CPU inquires at SP7 if a video cassette having management data recorded thereon has been loaded into the recorder unit. If the answer is affirmative, CPU 8 enters the subroutine RT1 and executes various processes (to be described) on and in response to the management data base. After completing this subroutine, the CPU inquires at SP8 if the contents of the management data base have been altered by the subroutine RT1. If this inquiry is answered in the affirmative, the CPU replaces the previously recorded management data with the new or updated management data, as represented by instruction SP9. Then, the CPU advances to inquiry SP10 to determine if the power has been turned off. If not, the processor returns to the aforementioned wait state. However, if power has been interrupted, routine RT0 is completed as represented by instruction SP11.

Figure 8A:
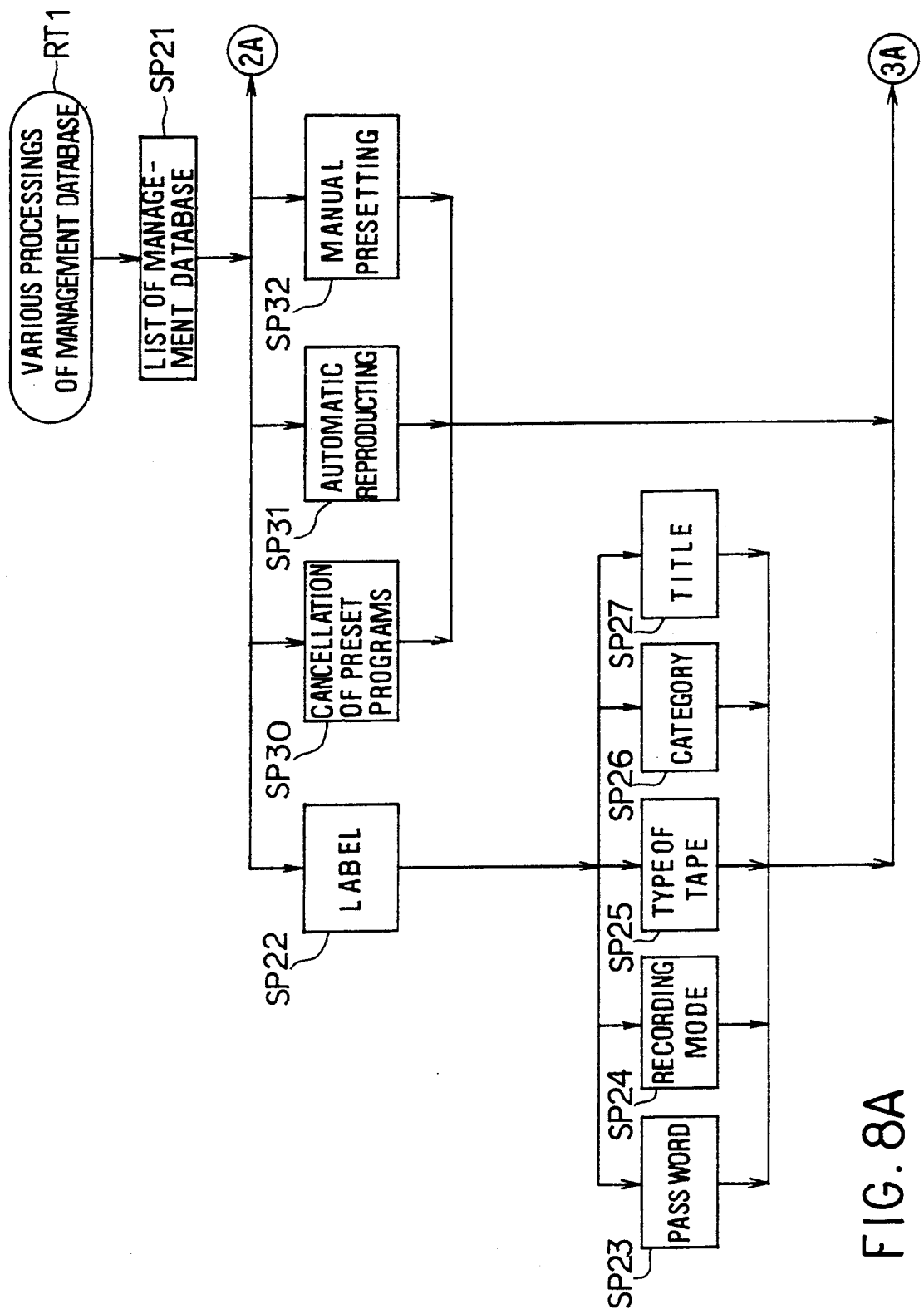
FIGS. 8A, 8B and 9 comprise flow charts of the procedure by which the management data base is processed in the video tape recorder.
Figure 8B:
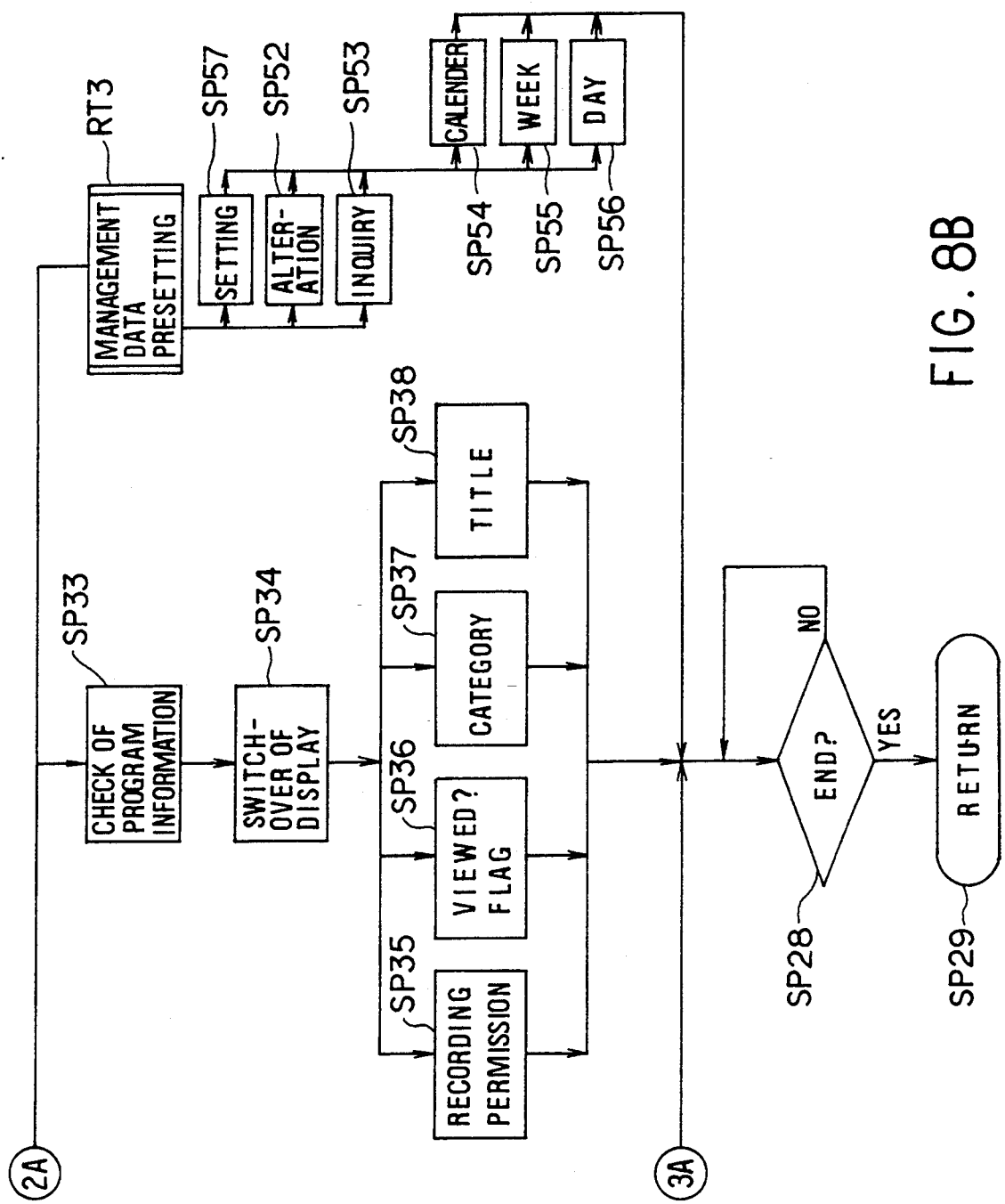

FIGS. 8A and 8B are a flow chart illustration of subroutine RT1 of FIG. 7B. On entering this subroutine at instruction SP21, a list or submenu of management items, including "LABEL", "CANCELLATION OF PRESET PROGRAMS", "AUTOMATIC REPRODUCING", "MANUAL PRESETTING", "CHECK OF PROGRAM INFORMATION" and "MANAGEMENT DATA PRESETTING", is displayed. The user can select any one of these items; and the CPU assumes a command waiting state until a displayed item is selected (as by touching the display screen or suitably positioning the cursor). "LABEL" represents an operation mode in which selected information contained in the volume information block $D_{VMX}$ (FIG. 5) or program information block $D_{PRX}$ (FIG. 6) of the management data $D_{AV}$ (FIG. 4) can be set or adjusted. If "LABEL" is selected in instruction SP22, the CPU displays the selected list "PASSWORD", "RECORDING MODE", "TYPE OF TAPE", "CATEGORY" and "TITLE" from which the user may make a selection.

If "PASSWORD" is selected, the password data of item A11 of the volume information block $D_{VMX}$ (FIG. 5) may be replaced with a new password selected by the user in step SP23. Similarly, if "RECORDING MODE" is selected, the recording/operation mode represented as item B8 of the program information block $D_{PRX}$ (FIG. 6) may be revised by the user and re-recorded in the management data $D_{AV}$ by instruction SP24. If "TAPE TYPE" is selected, item A10 of the volume information block $D_{VMX}$ representing the type of tape included in cassette 35 may be updated by the user (instruction SP25). If "CATEGORY" is selected, the category code data (Item B6 of the program information block $D_{PRX}$) may be updated by instruction SP26 to represent a sports event, a news event, a drama, etc. If "TITLE" is selected, the title data (Item B12 of the program information $D_{PRX}$) may be updated by instruction SP27.

After the aforementioned "LABEL" data has been updated, CPU 8 advances to inquire at SP28 (FIG. 8B) if the processing of subroutine RT1 has ended. If the answer is in the affirmative, the CPU returns by instruction SP29 to inquiry SP8 of the management processing loop shown in FIG. 7B.

Returning to instruction SP21 of subroutine RT1, if the user selects from the displayed list of management items the item "CANCELLATION OF PRESET PROGRAMS", CPU 8 proceeds to instruction SP30 to cancel the proposed events that had been selected and entered into the management data for recording.

If the user selects from the list displayed in step SP21 the item "AUTOMATIC REPRODUCING", the CPU advances to step SP31 to recover Item A13 from the volume information $D_{VMX}$ (FIG. 5) to display the order that had been selected for reproducing the events to be (or that had been) recorded. This order may be revised, as desired.

If the user selects from the displayed list the item "MANUAL PRESETTING", the CPU advances to step SP32 to enable manual setting of a predetermined number of events to be recorded; and data representing such preset events is entered as the management data.

After executing instruction SP30, SP31 or SP32, CPU 8 returns to inquiry SP8 of the management processing loop via steps SP28 and SP29 (FIG. 8B).

If the user selects from the displayed list of management items obtained from step SP21 the item "CHECK OF PROGRAM INFORMATION", CPU 8 advances to instruction SP33 (FIG. 8B) and then switches over the display, as by operating circuits 38 and 39 in step SP34. Now, the times "RECORDING PERMISSION", "VIEWED ? FLAG", "CATEGORY" and "TITLE" are displayed for selection by the user. Preferably, these items are displayed by predetermined display icons. This display permits information concerning a plurality of preset events to be checked or altered by using only a relatively narrow display area. The user may select a desired one of these items, whereupon the CPU advances to instruction SP35, SP36, SP37 or SP38, respectively. After executing the selected instruction, the CPU returns to inquiry SP8 of the management processing loop via steps SP28 and SP29.

Figure 9:
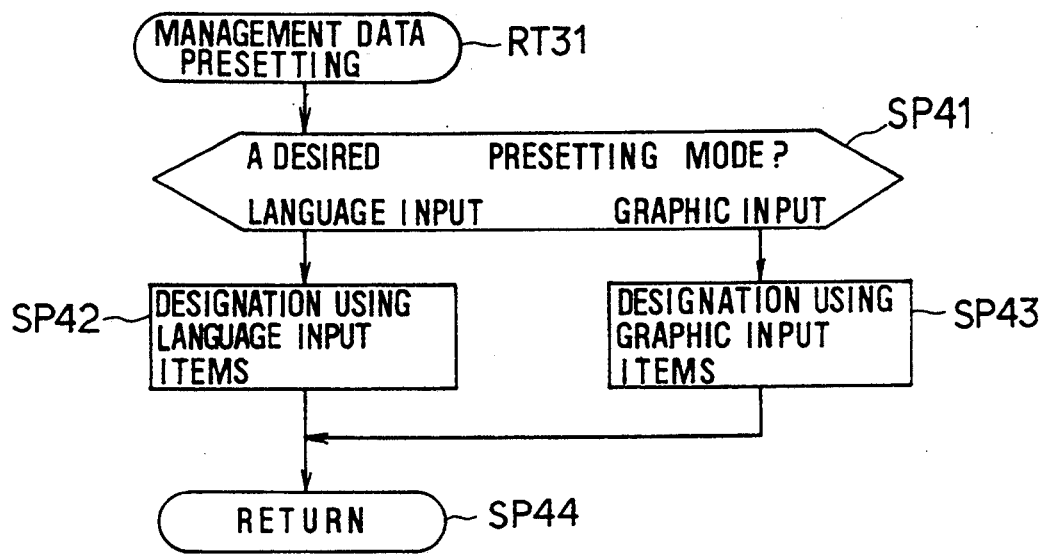
Figure 10:
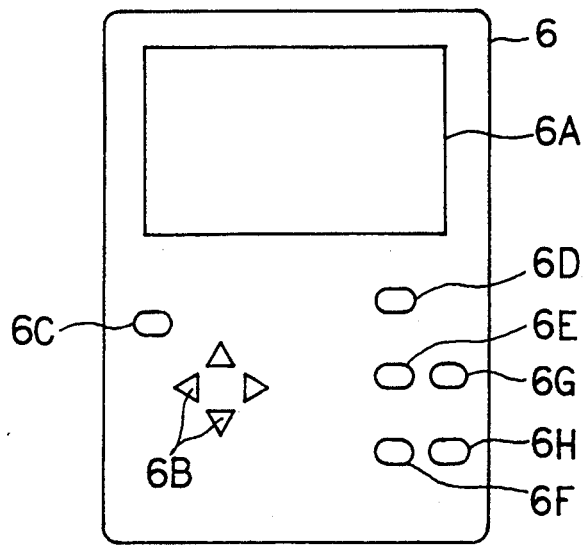
FIG. 10 is a schematic view of a remote controller used with the present invention.

If the user selects from the list displayed by step SP21 the item "MANAGEMENT DATA PRESETTING", the CPU enters the management data subroutine RT3, shown more particularly as the presetting processing routine RT31 of FIG. 9. In this routine, the presetting of events to be recorded may be carried out by using alphanumeric input data (referred to herein as language input items) or graphic input data (such as symbols or icons). Inquiry SP41 (FIG. 9) first is made to determine which of these presetting modes the user desires.

Language input items are displayed in a Table of Language Designated Items (Table TBL) in which selectable items are expressed in natural language, as shown in FIG. 11. Graphic input data are displayed by graphic representation, such as romaji characters, numbers or symbols. If the user selects language input items, CPU 8 displays Table TBL on display screens 4A and 6A and, depending upon the items selected from that Table by the user (to be described), supplies to register 44 (FIG. 1) the selected data. This selection process is represented by step SP42. Conversely, if the user selects the graphic input mode, the CPU displays graphic representations and, depending upon which representations are selected by the user, supplies the selected data to register 44 as represented by instruction SP43. After the user has selected input data from the language or graphic input mode, the CPU returns to the management data subroutine RT3 shown in FIG. 8B via step SP44.

After returning to subroutine RT3, CPU 8 displays on the display screens the selections "SETTING", "ALTERATION" and "INQUIRY" for user selection. Depending upon which of these items is selected, the CPU executes the corresponding instruction "SETTING", "ALTERATION" or "INQUIRY" represented by the step SP57, SP52 or SP53. Following this selection, the items "CALENDAR", "WEEK" and "DAY" are displayed, any one of which may be selected by the user. As a result of this selection, CPU 8 displays a monthly calendar display (FIG. 15), a week display (FIG. 16) or a day display (FIG. 17), all of which are described below. These displays assist the user in selecting and entering the starting time and/or the ending time of an event to be recorded. The CPU then returns via steps SP28 and SP29 to inquiry SP8 of the management processing loop.

Management data is recorded on the video tape, or is updated or is checked in response to the selection of the "MANAGEMENT DATA BASE" subroutine SP6 (FIG. 7B) while the CPU is in its wait state. If, however, the user selects the "SYSTEM SETTING" subroutine from the displayed operation mode menu, the CPU advances to instruction SP61 and displays on the display screens the submenu of selectable items "CURRENT TIME", "SLEEP TIMER", "RECORDING MODE", "NOISE REMOVAL", "BS ONLINE", "AUTOMATIC SETTING", "TUNER PRESETTING" and "LINE INPUTTING". Selection of one of these items in step SP62, SP63, SP64, SP65, SP66, SP67, SP68 or SP69 sets a corresponding operating condition of the system. The details of the "SYSTEM SETTING" subroutine form no part of the present invention and will not be described further, except to note that after the CPU completes this subroutine, it advances to instruction SP10.

If the user selects the "DESIRED SETTING" subroutine from the operation mode menu, as represented by step SP71, the CPU displays on the display screens the submenu of selectable items "SCREEN DISPLAY", "MANAGEMENT DATA BASE", "USER SETTING", "CHARACTER", "TIMER SETTING", "USER LEVEL", "MESSAGE" and "VOICE". Selection by the user of one of these items in step SP72, SP73, SP74, SP75, SP76, SP77, SP78 or SP79 enables CPU 8 to initiate a corresponding function, which is not material to the present invention. Thereafter, the CPU advances to step SP10.

If the user selects the "TIMER SETTING" subroutine from the operation mode menu, as represented by step SP81, CPU 8 displays on the display screens the submenu of "PRESETTING", "ALTERATION" and "INQUIRY". Selection by the user of one of these items in step SP82, SP83, or SP84 displays on the display screens the submenu of "CALENDAR", "WEEK" and "DAY" which, as will be described, are used in presetting the recorder to record desired events. Selection of one of these items by the user results in a calendar display, a week display or a day display, in accordance with step SP85, SP86 or SP87. After the "TIMER SETTING" subroutine is completed, the CPU advances to step SP10.

Thus, CPU 8 controls video tape recorder unit 3 in response to the data generated by the user when the input information processing program RT0 shown in FIG. 7 is executed.

The manner in which management data is preset by the language input items now will be described. As stated above, when the "MANAGEMENT DATA PRESETTING" subroutine RT3 is selected by the user from the management data submenu displayed on the display screens by instruction SP21, CPU 8 executes the instructions shown in FIG. 9; and if "language input items" is selected at inquiry SP41, the Table of Language Designated Items TBL shown in FIG. 11 is displayed. This permits the user to input management data directly to the processor system. Similarly, when the timer setting subroutine is selected in step SP81 (FIG. 7B), the CPU displays the table TBL shown in FIG. 11.

In the present embodiment, Table TBL comprises a list of terms with which the user interactively supplies commands to program the video tape recorder using natural language, e.g. simple English. Table TBL contains terms which represent both desired operations and time, and are arranged in table form to be selected individually or in combination as a plurality of words. Preferably, terms that relate to time may be selected in conjunction with terms that represent before or after the current time as well as with terms that represent day or week, e.g. "TODAY", "TOMORROW", "DAY AFTER TOMORROW" or "NEXT WEEK". Terms which represent repetition are designated by week or day, e.g., "EVERY WEEK" or "EVERY DAY". Terms which relate to a calendar are designated by, for example, "MONTH", "DAY", "SUNDAY" to "SATURDAY". Terms which relate to time during the day are designated by, for example, "IN THE MORNING", "IN THE AFTERNOON", "O'CLOCK", "MINUTE" and "BETWEEN". Terms that relate to input sources of events to be recorded are designated "BS", "LINE", "CABLE", "ch" and "$\beta$III". Terms that relate to control over operations include those such as "DISPLAY", "CHANGE", "CANCEL", "CONTINUE UNTIL", "RECORD PRESETTING", "END", "STOP . . ." and ".".

Table TBL also includes connector terms that may be used with the foregoing expressions, such as "FROM", "UNTIL", "THE PROGRAM OF", "OF", "AT" and "TO". The Table further includes numeral information from "0" to "12" and inquiry response terms for interaction with CPU 8, such as "YES" and "NO".

Preferably, Table TBL is displayed on display screen 6A and on display screen 4A when the subroutine "MANAGEMENT DATA PRESETTING" or when the subroutine "TIMER SETTING" is executed to enable the user to select terms from the Table and thereby supply corresponding commands to the CPU. For example, when it is desired to program the recorder for an event which is broadcast on channel 1 from 8 o'clock to 9 o'clock on Monday night, the user selects from Table TB1 the following terms in the following sequence: "RECORD PRESETTING", "THE PROGRAM OF ", "1", "CH", "FROM", "8", "O'CLOCK", "TO", "9", "O'CLOCK", "IN THE AFTERNOON", "OF", "MONDAY", "EVERY WEEK" and ".". When this selection from the Table is made during the "MANAGEMENT DATA PRESETTING" subroutine RT3, the input data representing the desired recording of the event is stored in register 44 from which CPU 8 reads this data and records same as the management data $D_{AV}$ in the management data base area $F_{AVV}$ (or in the management data base area $F_{AVA}$) on tape 36. That is, the recording starting time information, i.e., the numerical data representing "8 O'CLOCK IN THE AFTERNOON OF EVERY FRIDAY", is recorded as Item B9 in the program information block $D_{PRX}$. Also, information representing the recording ending time, i.e., the numerical data representing "9 O'CLOCK", is recorded as Item B10 in the program information block $D_{PRX}$ and information representing the input source, i.e., the data representing "1 channel", is recorded as Item B7 in the program information block $D_{PRX}$. The manner in which the CPU writes data to tape 36 from register 44 is conventional and is known by those of ordinary skill in the art. Hence, such recording of management data is not described further.

If the above-described selection from Table TBL is made during the execution of the TIMER SETTING subroutine of step SP81, the input data representing when a desired event is to be recorded is written as new event recording program information to a memory (not shown) provided in video tape recorder unit 3.

When it is desired to make a change relating to a preset event, for example, to change the channel number form channel 6 to channel 8 of an event which will be broadcast the next day, the user may execute the "MANAGEMENT DATA PRESETTING" subroutine RT3 and select from Table TBL the following items in the indicated sequence: "CHANGE", "THE PROGRAM OF", "TOMORROW", "FROM", "6", "ch", "TO", "8", "ch". As a result, input source data item B7 of program information $D_{PRX}$ in management data $D_{AV}$ recorded in management data base area $F_{AVV}$ (or in management data base area $F_{AVA}$) representing "6 ch", is replaced by "8 ch" thus changing the management data that had been established previously.

If the above-described channel change for the recorder is made during the TIMER SETTING subroutine of step SP81, the channel data which had already been stored in the memory provided in the video tape recorder unit is replaced by this new channel data.

If it is desired to cancel information relating to the recording of an event, e.g., if it is desired to cancel the recording of an event that will be broadcast next Tuesday, the user may select from displayed Table TBL, either during the subroutine RT3 or during the subroutine of step SP81, the following items in the following sequence: 37 CANCEL", "THE PROGRAM OF", "TUESDAY", "NEXT WEEK". If this cancellation operation is executed during the "MANAGEMENT DATA PRESETTING" subroutine RT3, all of the information relating to the event that is to be recorded every Tuesday, that is, Item B9 in the program information block $D_{PR}$ representing "TUESDAY EVERY WEEK", and which is recorded in management data base area $F_{AVV}$ (or in management data base area $F_{AVA}$), is canceled. Alternatively, if this cancellation operation is executed during the "TIMER SETTING" routine of step SP81, the information relating to the event to be recorded every Tuesday that is stored in the memory of the video tape recorder unit is canceled.

It will be appreciated that a user can input programming information more easily and accurately by using Table TBL shown in FIG. 11 because common English is used as the input data.

It is possible that, during the TIMER SETTING subroutine represented by step SP81, or during the MANAGEMENT DATA PRESETTING subroutine RT3, the user may select a future event for recording that will be present (e.g. it will be broadcast) at a time that has already been reserved for recording a different event. Should this occur, CPU 8 displays on display screen 4A and on display screen 6A an Overlap Display DBL of the type shown in FIG. 12. This Overlap Display contains time graduations $D_{TIME}$ in the form of a horizontal index and a time zone $T_{ZON1}$, shown as time zone "B", which represents the time(s) that have already been preset to record one or more events at a particular time(s) on a particular day. For illustration purposes, time zone B indicates that two events already have been selected to be recorded on Saturday, October 21 at 4:00 and at 7:30, respectively.

The Overlap Display DBL also contains a time zone $T_{ZON2}$ positioned above the event preset time zone $T_{ZON1}$ and shown as time zone A, which represents the time that a user is attempting to set for the recording of an event. To distinguish time zones A and B, time zone A is referred to as a currently preset time zone and time zone B is referred to as an already preset time zone. In the illustrated example, currently preset time zone A indicates an event to be recorded on Saturday, October 21 from about 5:30 to about 7:45. If this selection is permitted, the event selected at time zone A would commence before the first event recorded at time zone B is completed and would end after the second event displayed at time zone B begins. Clearly, this represents an overlap and would prevent the accurate recording of the time zone A event if not corrected.

On Overlap Display DBL, an overlapping time zone display area $T_{ZONX}$ is provided between time zones $T_{ZON1}$ and $T_{ZON2}$. Overlapping time zone display area $T_{ZONX}$ displays overlapping indications DB1 and DB2 which note where the time zones of the already preset events PRG11 and PRG12 overlap the time zones of the currently preset event PRG21. The Overlap Display DBL enables detection of the already preset events whose time zones overlap that of a currently preset event; and this detected overlap is displayed on display screens 4A and 6A. In this way, the user can recognize an overlap and preset the recorder to record program PRG21 in such a manner that the recording time of the currently preset event does not overlap the recording time of the already preset event. This enables the user to preset the recorder safely and reliably so that an important event is recorded accurately and completely.

Figure 13A:
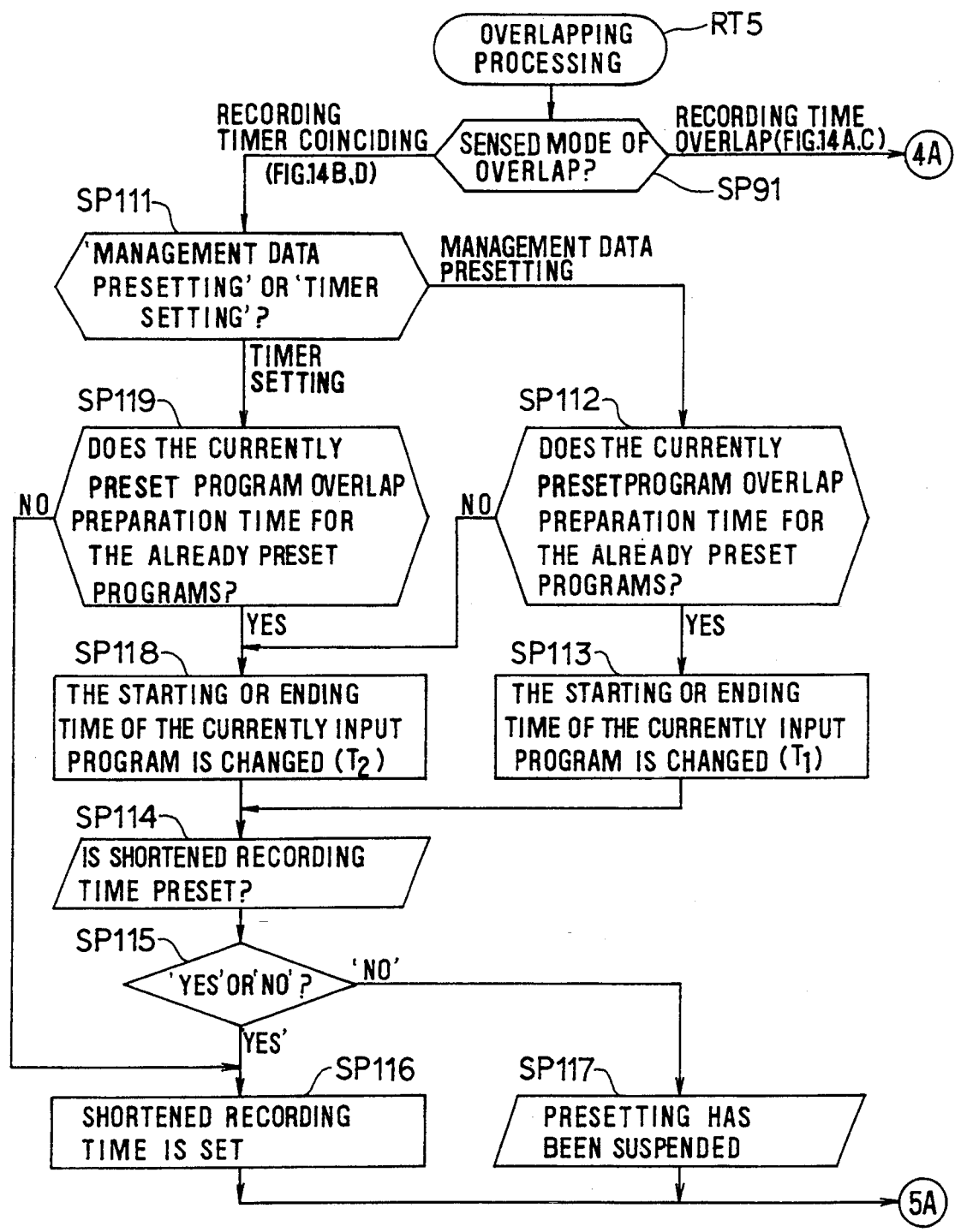
FIGS. 13A and 13B comprise a flow chart of the manner in which the display of FIG. 12 is produced.

When a currently preset event is detected to overlap an already preset event, the CPU executes the overlap processing routine RT5 shown in FIG. 13. As shown, CPU 8 determines the type of overlap (i.e. the mode of overlap) in step SP91 shown in FIG. 13A. FIGS. 14A-14D illustrate the types of overlap that are expected. As shown in FIG. 14A, a first overlap mode occurs when the recording starting time $f_1$ of an already preset event PRG10 precedes the recording ending time $t_2$ of a currently preset event PRG20, resulting in a portion of the recording time of the last part of the currently preset event PRG20 overlapping the initial recording portion part of the already preset event PFG10. This is referred to as the recording time overlapping mode.

Another overlap mode occurs when the recording ending time $t_2$ of a currently preset event PRG20 coincides with the recording starting time $f_1$ of an already preset event PRG10. This is referred to as the recording time coinciding mode and is shown in FIG. 14B.

Figure 14A:
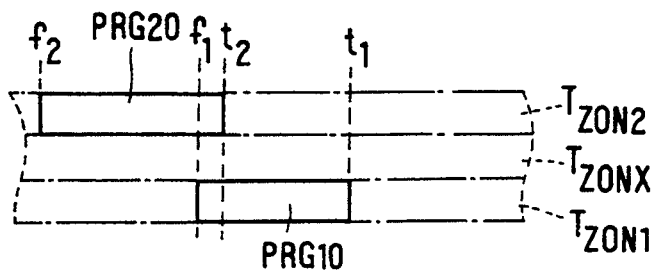
FIGS. 14A–14D show event overlapping modes that are detected by the routine of FIGS. 13A–13B.
Figure 14B:
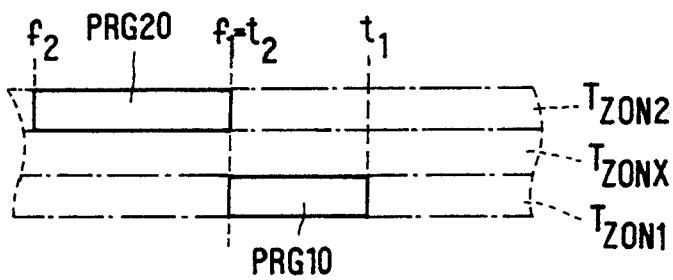
Figure 14C:
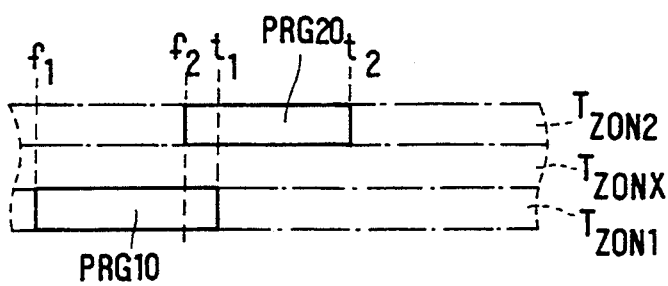

A third overlap mode occurs when the recording starting time $f_2$ of a currently preset event PRG20 precedes the recording ending time $t_1$ of an already preset event PRG1O, resulting in the initial portion of the recording time of the currently preset event PRG20 overlapping the last portion of the recording time of the already preset event PRG10, as shown in FIG. 14C. This also is referred to as the recording time overlapping mode.

Figure 14D:
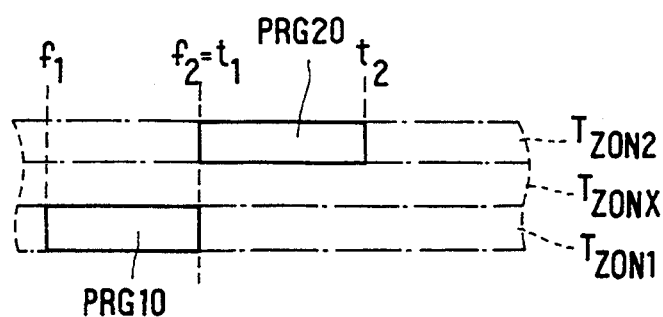

A fourth overlap mode occurs when the recording starting time $f_2$ of a currently present event PRG20 coincides with the recording ending time $f_1$ of an already preset event PRG10, as shown in FIG. 14D. This also is referred to as the recording time coinciding mode.

Figure 13B:
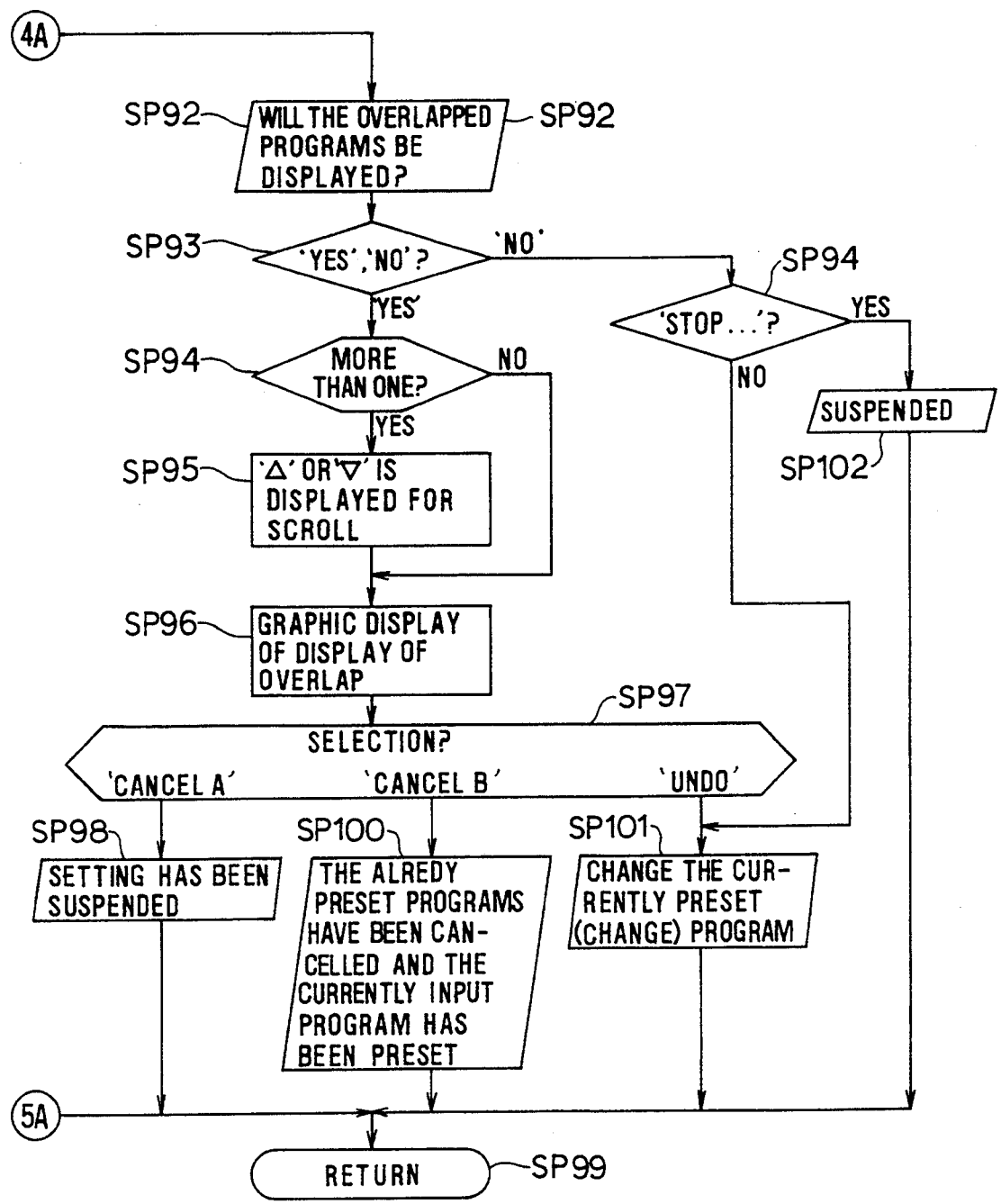

When CPU 8 determines whether the overlap is of the type shown in FIGS. 14A or 14C, i.e. the overlap is the recording time overlapping mode, the subroutine advances from inquiry SP91 to display the message "WILL THE OVERLAPPED PROGRAMS BE DISPLAYED ?" as represented by step SP92 (FIG. 13B). Thereafter, inquiry SP93 determines the response of the user. If the user answers "YES", the CPU inquires at SP94 if more than one currently preset event overlaps already preset events. If the answer is affirmative, the CPU advances to instruction SP95 to display "Δ" and "∇" on the display screens to allow the user to scroll the screen.

Figure 12:
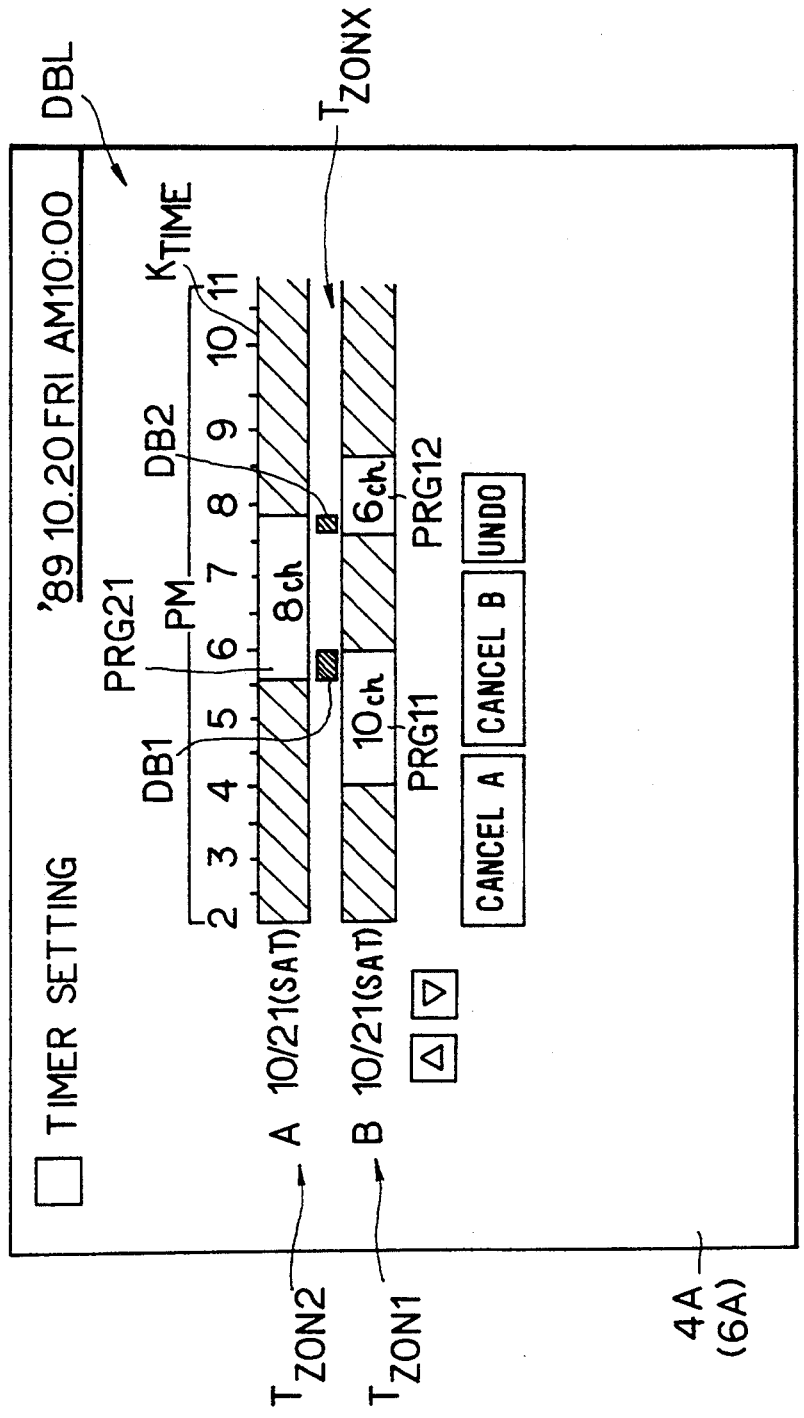
FIG. 12 illustrates an overlap display provided by the present invention.

Next, at instruction SP96, the CPU displays the Overlap Display DBL shown in FIG. 12 and then awaits the response of the user to the graphic display. As shown in FIG. 12, in addition to the display of the time zones $T_{ZON1}$, $T_{ZON2}$ and $T_{ZONX}$, user-selectable items such as "CANCEL A", "CANCEL B" and "UNDO" are displayed. Action by the user includes cancellation of the currently preset event PRG21 displayed on the time zone $T_{ZON2}$, cancellation of the already preset events PRG11 and PRG13 displayed on the program time zone $T_{ZON1}$, and changing, or "undoing" the parameters that are currently preset.

Overlap display DBL permits the user to confirm from the overlap displays DB1 and DB2 that portions of the currently preset event PRG21 overlap the already preset events PRG11 and PRG12 in the recording time overlapping mode (FIG. 14A or 14C). Consequently, the user may cancel the recording settings for either the already preset events or the currently preset event. Thereafter, in step SP97 the CPU determines which item the user has selected. For example, if the user selects "CANCEL A", the CPU advances to step SP98 to display the message "SETTING HAS BEEN SUSPENDED" in step SP98, and then returns via step SP99 to the TIMER SETTING subroutine of step SP81 or to the MANAGEMENT DATA PRESETTING subroutine RT3. Thus, the CPU proceeds to the next step in either of these subroutines without setting the event-recording information for the currently preset event that had been input by the user and that would overlap an already preset event.

If the user selects "CANCEL B" in step SP97, the CPU displays the message "THE ALREADY PRESET PROGRAMS HAVE BEEN CANCELED AND THE CURRENTLY INPUT PROGRAM HAS BEEN PRESET" in step SP100, and then returns via step SP99 to the TIMER SETTING subroutine of step SP81 or to the MANAGEMENT DATA PRESETTING subroutine RT3, depending upon which subroutine had been executed. Thus, when overlaps occur, the CPU responds to user selection of "CANCEL B" and cancels the already preset events PRG11 and PRG12 while setting recording parameters of the currently input event PRG21.

If the user has selected "UNDO" in step SP97, the CPU displays the message "CHANGE THE CURRENTLY PRESET (CHANGE) PROGRAM" in step SP101 and then returns via step SP99 to the TIMER SETTING subroutine of step SP81 or to the MANAGEMENT DATA PRESETTING subroutine RT3. Here, the CPU prompts the user to change the data relating to the recording parameters of the currently preset event PRG21.

If the user has replied in the negative to inquiry SP93, the CPU determines whether or not the user has selected "STOP . . . " in reply to inquiry SP94. If not, CPU 8 displays the message "CHANGE THE CURRENTLY PRESET (CHANGE) PROGRAM" in step SP101, similar to the selection by the user of "UNDO", as mentioned above. If stop is selected in step SP94, the CPU displays the message "SUSPENDED" in step SP102 and then advances to instruction SP99. Thus, if the user decides not to display those events having overlapping recording times, the CPU prompts the user to change the information currently being preset to record an event or, alternatively, the CPU simply cancels the input information produced for the currently preset event.

The above-described subroutine shown in FIG. 13B is executed by the CPU when the recording time of the currently preset event PRG21 overlaps the recording time of an already preset event in the recording time overlapping mode (FIGS. 14A and 14C). If it is determined in step SP91 that overlapping has occurred in the recording time coinciding mode shown in FIG. 14B or 14D, CPU 8 inquires at SP111 whether the currently selected event presetting mode is the "MANAGEMENT DATA PRESETTING" mode or the "TIMER SETTING" mode. If the former, the CPU inquires at SP112 whether or not the recording ending time of the currently preset event PRG 21 overlaps the preparation time of the already preset event PRG11 or PRG12 (FIG. 12). An affirmative answer means that there will not be sufficient time for the video tape recorder to prepare the recording of the preset event that has already been selected and whose recording parameters have already been preset and recorded on the management data base area of the video tape. To avoid this possibility and the resultant incomplete recording of an event caused thereby, the CPU advances to instruction SP113 to change the recording starting time and/or the recording ending time of currently preset event PRG21 by a predetermined amount of time (for example, about ten minutes) to shorten the recording duration of the currently preset event PRG21, and then displays the message "IS SHORTENED RECORDING TIME PRESET ?" of step SP114. Thereafter, the CPU awaits the response of the user at inquiry SP115. If the user's response is "YES", the CPU writes the new starting or ending time as part of the recording parameters for the currently preset event PRG21 in the management data base area $F_{AVV}$ (or in the management data base area $F_{AVA}$) in step SP116, and then returns to the MANAGEMENT DATA PRESETTING subroutine RT3 of FIG. 8 via step SP99. But, if the user's response to inquiry SP115 is "NO", the CPU displays the message "PRESETTING HAS BEEN SUSPENDED" in step SP117, and then advances to step SP99.

The foregoing has assumed that inquiry SP112 is answered in the affirmative. A negative answer, however, means that, even if there is recording time coinciding overlap (FIG. 14D), there still is some time to prepare for the recording of the currently preset program PRG20. Therefore, the CPU advances to instruction SP118 to change the recording starting time and/or the recording ending time for the currently input event by a fixed amount of time (for example, about five minutes) to shorten the recording duration of that event, and the CPU then executes steps SP114, SP115, SP116 or SP117 as aforementioned. Thereafter, the CPU returns to the MANAGEMENT DATA PRESETTING subroutine RT3 via step SP99.

If inquiry SP111 determines that the currently selected event presetting mode is the timer setting mode initiated by the subroutine commencing with step SP81, inquiry SP119 is made to determine if the recording ending time of the currently preset event PRG21 overlaps the preparation time for the already preset event PRG11 or PRG12 (FIG. 12). If the answer is affirmative, the recording starting time or recording ending time of the currently preset event PRG21 is changed in step SP118, and then the CPU returns to the timer presetting subroutine of step SP81 through aforementioned steps SP114, SP115 and SP116 or SP117. However, if the answer to inquiry SP119 is negative, meaning that there is substantially no overlap in the recording times of the currently preset and already preset events, the CPU jumps to step SP116 to preset the recording parameters of the currently input event.

Thus, if the recording time of the currently preset event PRG21 (FIG. 12) overlaps the recording time of the already preset event PRG12, the display of event PRG12 as well as that of event PRG11 on time zone B ($T_{ZON1}$) and the display of event PRG21 on time zone A ($T_{ZON2}$) produces the overlap display DB2 (as well as DB1) on overlapping time zone display area $T_{ZONX}$. This allows the user to recognize easily and reliably that the recording times selected for the currently input event cannot be preset in their complete form, i.e., recording cannot be carried out from the selected recording starting time to the selected recording ending time. This, in turn, enables the user to preset the recording parameters for the event in such a manner that the recording time thereof does not overlap that of already set events. Hence, the user may program the recorder to record a desired event in a desired time zone without overlapping any of the recording times previously selected for other events.

In steps SP113 and SP118 of FIG. 13A, the recording starting time or the recording ending time are changed by predetermined, fixed amounts to shorten the overall recording times of the currently input event. However, the shortened recording time may be variable so as to be determined in accordance with the degree of overlap between the currently and already preset events.

It is recalled that when the user selects "TIMER SETTING" from the menu displayed in response to, for example, operation of menu display key 6E of remote controller 6, Table TBL shown in FIG. 11 is displayed. This Table TBL includes the item "CALENDAR". If the user selects "CALENDAR" as by touching the display screen at the location whereat "CALENDAR" is displayed, the CPU displays the Calendar Display DIP1 shown in FIG. 15. The Calendar Display provides indications of seven weekdays (Sunday, Monday, Tuesday . . . Saturday), which are aligned horizontally, for each of five weeks. Time graduations $K_{TIME}$, shown as horizontal broken lines, are displayed for each week and preset event displays $K_{TOKU}$ representing the recording times and approximate durations of already preset events to be recorded as well as programs that have already been recorded are displayed on the time graduations. Calendar Display DIP1 illustrates a calendar of about one month beginning with the present time (which, for example, is assumed to be 10 a.m. Friday, Oct. 20, 1989) and encompassing five weeks, each being displayed as a separate row.

In the illustrated embodiment, respective week designations "FIRST WEEK", "SECOND WEEK", "THIRD WEEK", "FOURTH WEEK" and "FIFTH WEEK" are displayed at the left end portion of each row. If the user selects one of these week designations, as by touching the desired display, the CPU displays Week Display DIP2 shown in FIG. 16. Here, designations of the seven weekdays (and their respective dates) included in the week selected by the user are aligned in the vertical direction and the twenty-four hours for each day are aligned in the horizontal direction. For the purpose of the present discussion, a first time zone (e.g. the hours in a day) may be thought of as aligned in the horizontal direction of the display screens while a second time zone (e.g. days of a week) may be thought of as in the vertical direction. Time graduations $K_{TIME}$ representing the twenty-four hours in a day are displayed in each row, and the preset event displays $K_{TOKU}$ representing time and duration of each event to be recorded are displayed overlying the time graduations.

Figure 17:
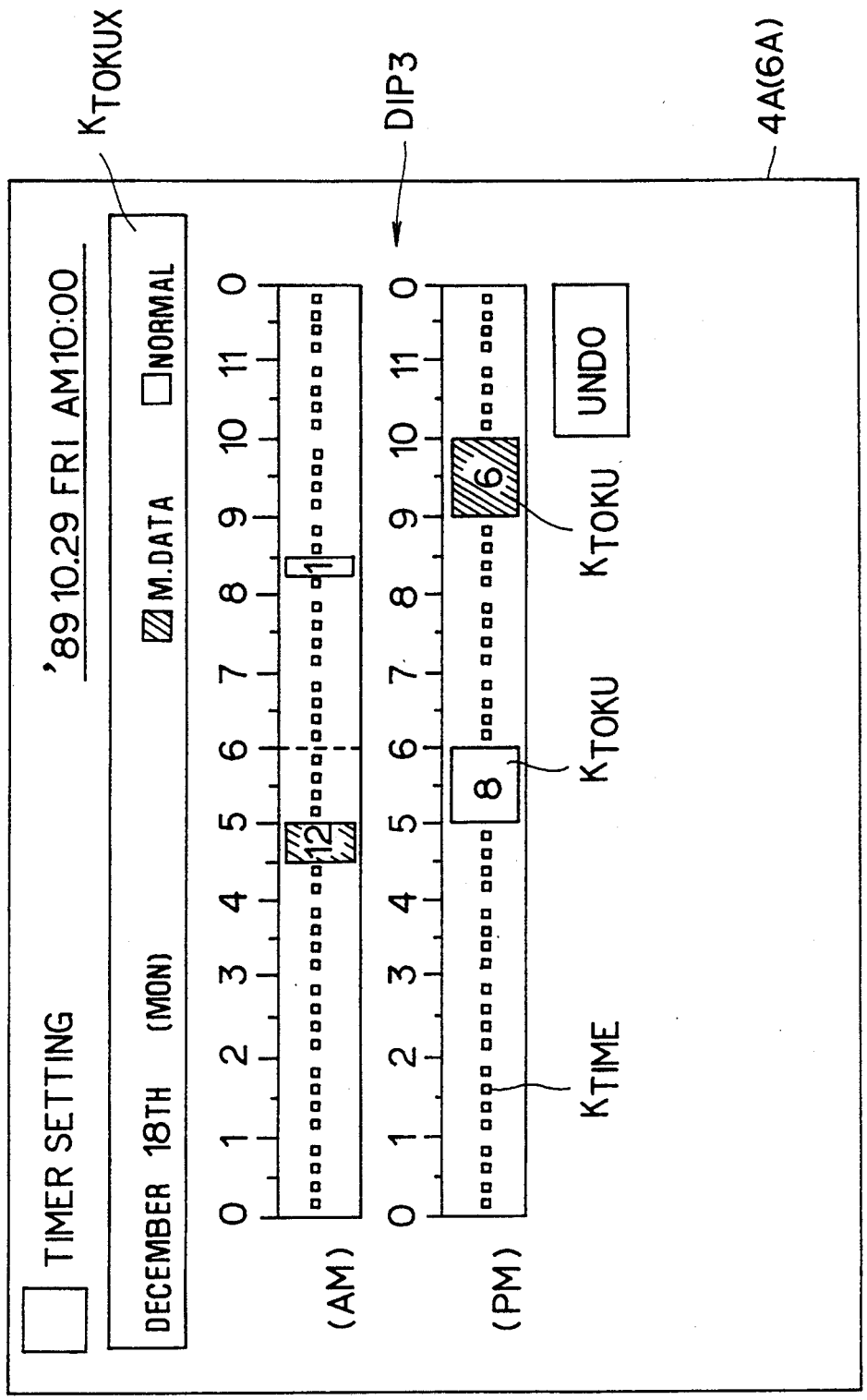
FIG. 17 shows a day display provided by the present invention.

If the user selects one of the "DATE" items displayed at the left end of each row, as by touching the display screen thereat, CPU 8 displays Day Display DIP3 such as that shown in FIG. 17. The Day Display is provided with two rows each containing time graduations $K_{TIME}$ representing twelve hours (one row represents A.M. and the other represents P.M.) and preset event displays $K_{TOKU}$ which represent the time of recording and duration of each preset event. For the purpose of this discussion, a first time zone containing twelve hours may be thought of as aligned in the horizontal direction while a second time zone (representing morning and afternoon) may be thought of as aligned in the vertical direction.

The preset event displays $K_{TOKU}$ are classified into two types: those which are included in the management data base (and are recorded in the management data base area on the video tape) and those which are not (that is, those which represent the normal presetting of desired events and may be stored in register 44 or video RAM 42 of FIG. 1, but are not recorded on the tape). These two types of displays $K_{TOKU}$ are displayed at the upper right corner of the Calendar, Week and Day Displays as indicia $K_{TOKUX}$.

At the left portion of Calendar Display DIP1 (FIG. 15), Month Displays $K_{TSU}$, representing the months contained within Calendar Display DIP1 are displayed (i.e. the present month and the following month are indicated). If the user selects either of these displayed months, a calendar of the selected month is displayed. For example, if the user selects "NOVEMBER" from the Month Displays, a calendar from "NOVEMBER 1st" to "NOVEMBER 30th" is displayed.

Figure 15:
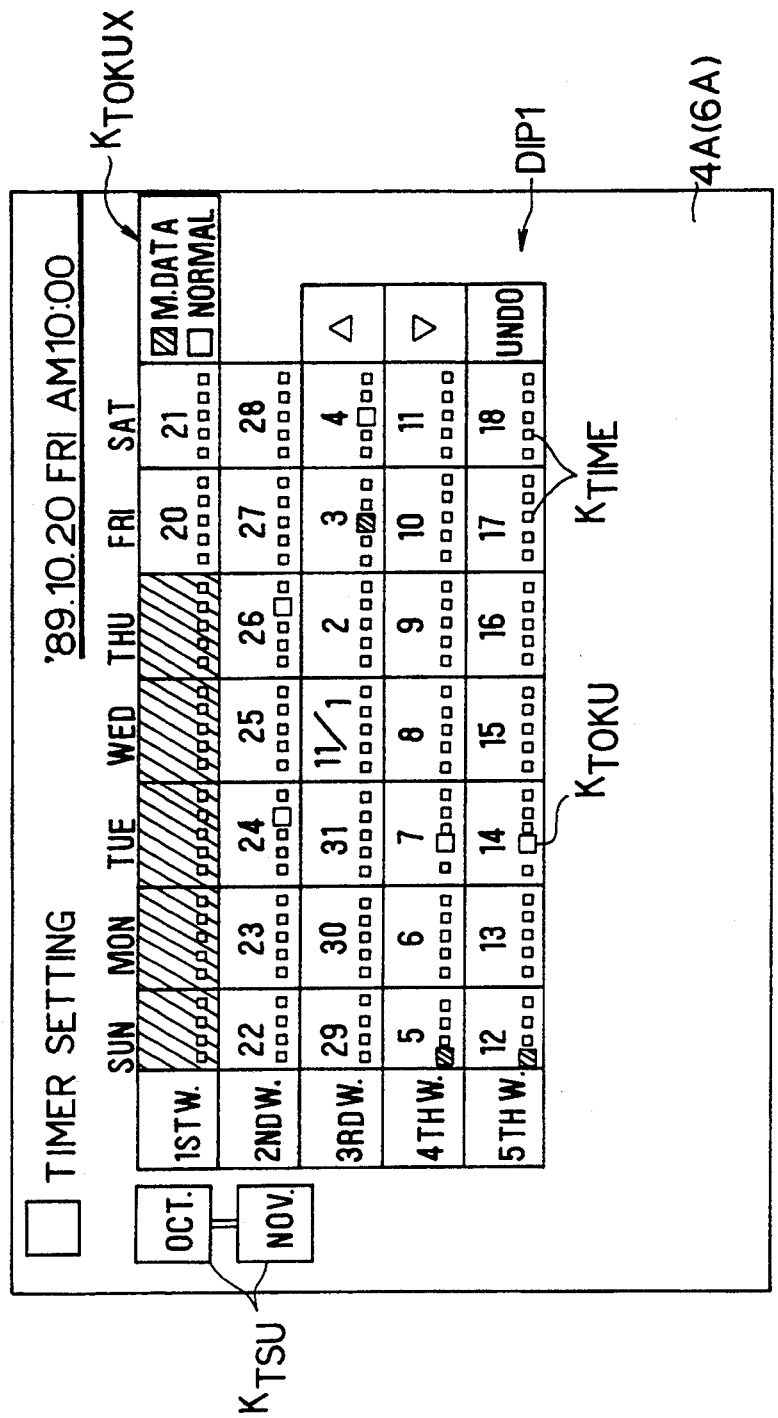
FIG. 15 shows a calendar display provided by the present invention.
Figure 16:
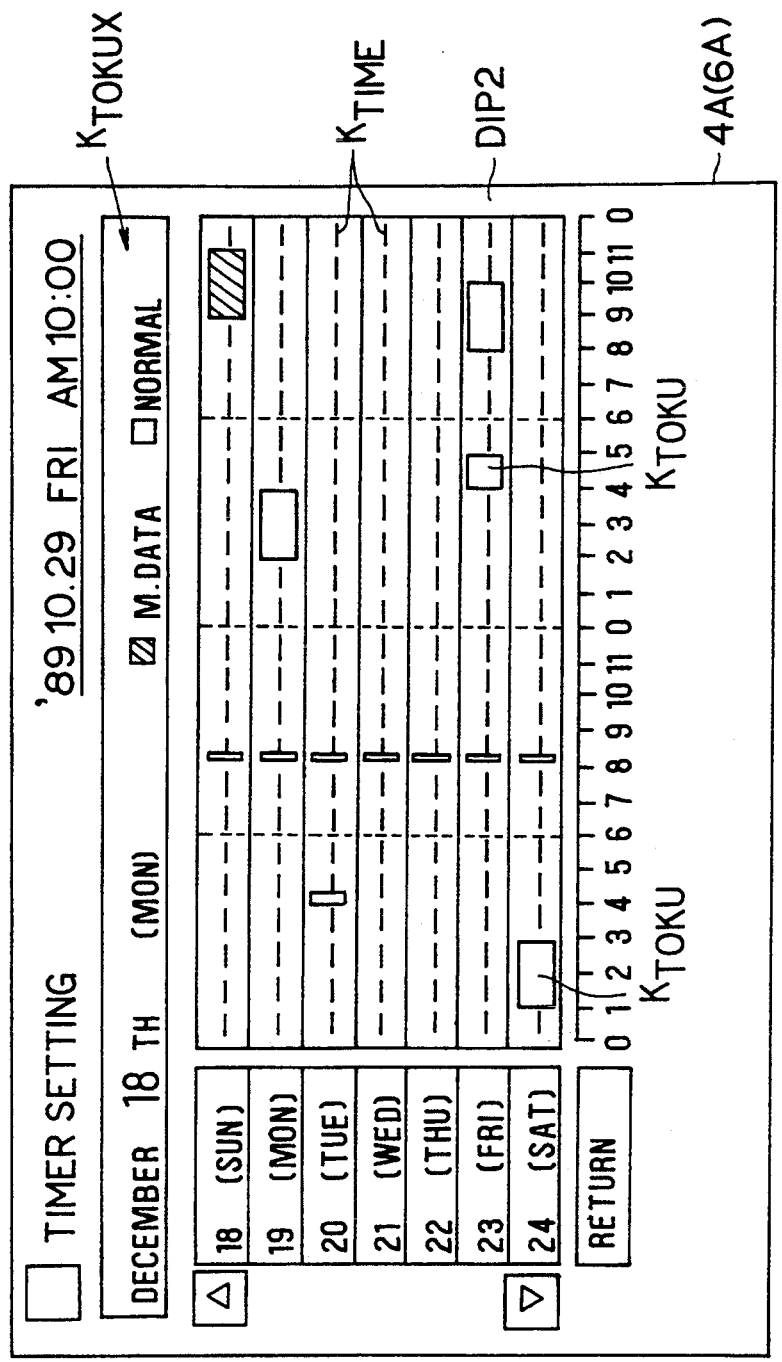
FIG. 16 shows a week display provided by the present invention.
Figure 18A:
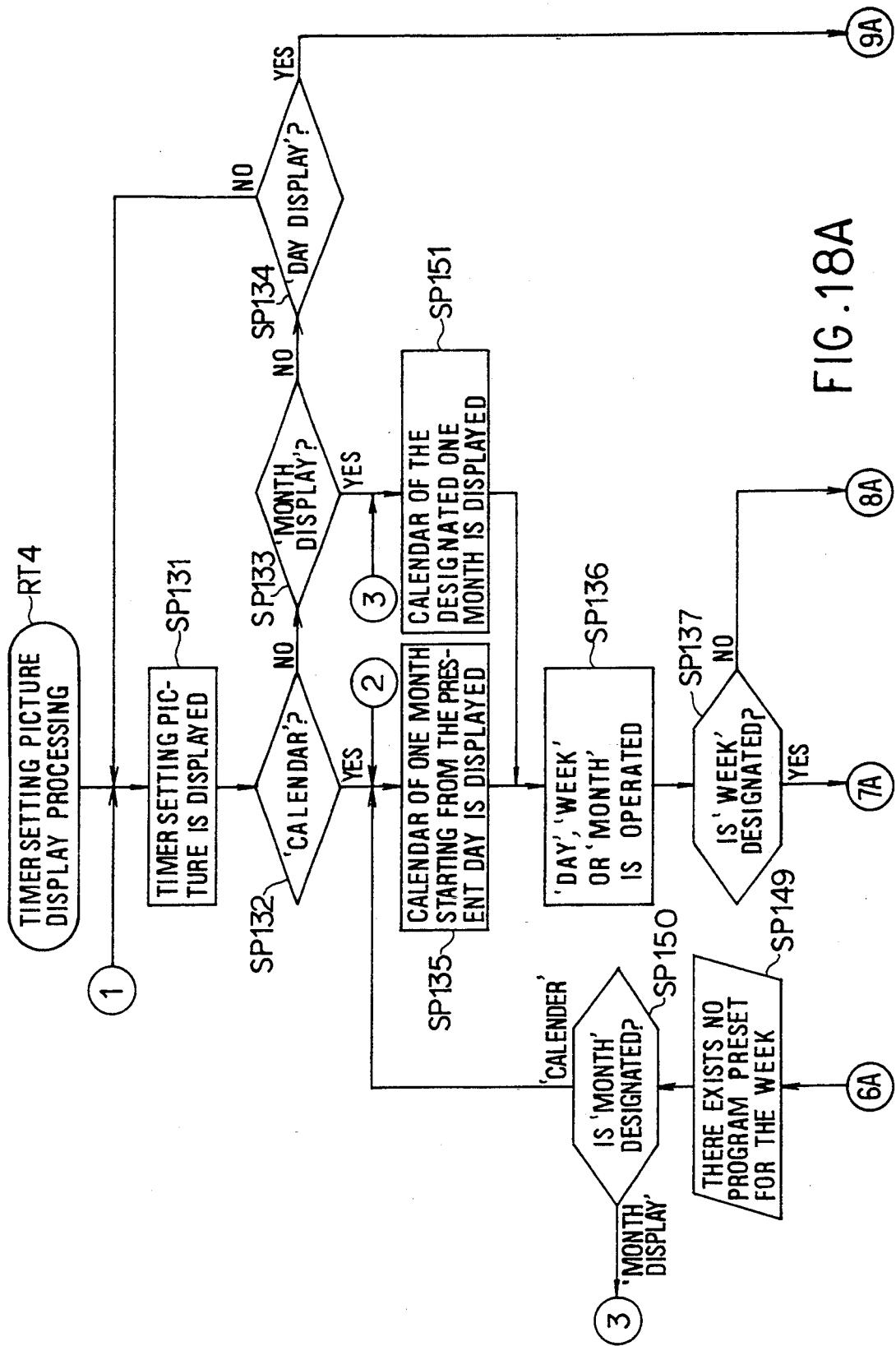
FIGS. 18A–18B comprise a flow chart of the manner in which a timer setting screen display is produced.
Figure 18B:
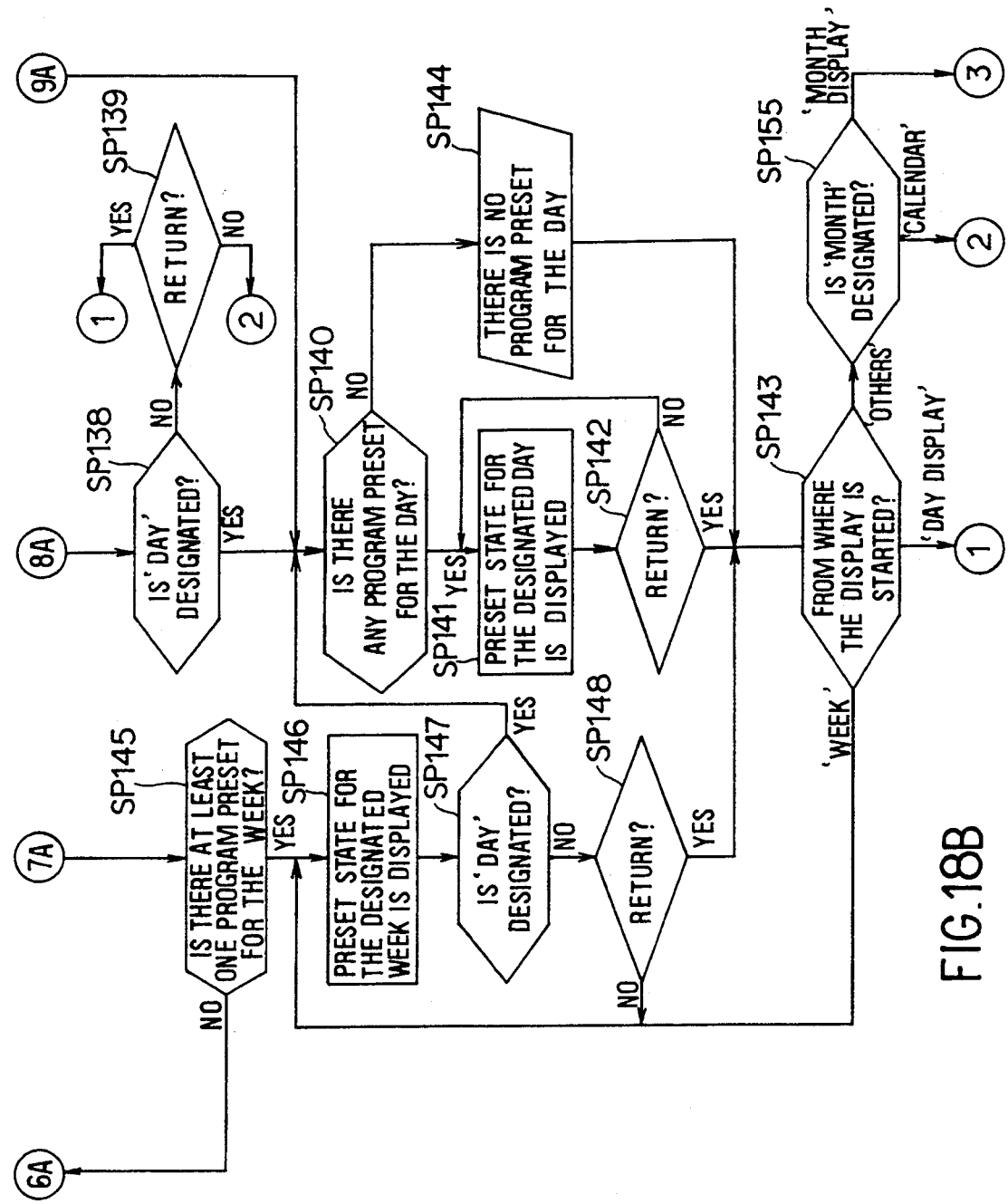

CPU 8 executes the subroutine illustrated in FIGS. 18A and 18B to cause the calendar, week or day displays shown in FIGS. 15 to 17 to be displayed. For example, let it be assumed that the user had selected the "TIMER SETTING" subroutine from the operation mode menu, as represented by step SP81. The CPU enters the timer setting picture display processing subroutine RT4 shown in FIG. 18A and advances to instruction SP131 to display the Table TBL of FIG. 11. Here, the CPU cycles through the loop comprised of steps SP132-SP133-SP134-SP131-SP132 awaiting selection by the user of "CALENDAR", "MONTH" or "DAY" from Table TBL.

If the user selects "CALENDAR", the CPU inquiry SP132 is answered in the affirmative and the subroutine advances to step SP135 to display Calendar DIP1, shown in FIG. 15. Thereafter, the subroutine proceeds to step SP136 whereat the user selects an event presetting time designation by selecting a day, a week or a month from the Calendar Display. In practical operation, the user positions the cursor of remote controller 6 (FIG. 10) at one of the days included in the Calendar Display (e.g. Sunday, Monday, etc.) and then presses execution key 6C to select for processing the day at which the cursor is positioned. Alternatively, the user may position the cursor at "FIRST WEEK", "SECOND WEEK", . . . "FIFTH WEEK" and then press the execution key to select for processing the particular week at which the cursor is positioned. As a further alternative the user may position the cursor at one of Month Displays $K_{TSU}$ and then press the execution key to select the identified month for processing.

If the user selects "Δ" or "∇" at the time that the Calendar Display is displayed, the Calendar Display scrolls up or down to display a calendar of the month which precedes or follows the month shown in the Calendar Display.

Step SP136 is followed by a loop comprised of inquiries SP137, SP138 and SP139 together with instructions SP135 and SP136 which awaits user input of a suitable command, as aforementioned. If the user selects "UNDO" from the FIG. 15 display, the CPU returns to the display that had been provided previously, such as the display of Table of FIG. 11.

Selection of a day or a week in step SP136 is detected by inquiries SP137, SP138 and SP139. When no selection is made by the user, the CPU cycles through the loop comprised of these inquiries. If the user selects "UNDO", this is detected in inquiry SP139 and the CPU returns to step SP131 where it displays the previous display, i.e. Table TBL (FIG. 11).

However, if the user selects one of the displayed day items from the Calendar Display while the CPU cycles through this loop, the "DAY" selection is detected in inquiry SP138, and the subroutine advances to inquire at SP140 whether or not events have been preset for recording for the selected day. If the answer is affirmative, the CPU proceeds to step SP141 to display Day Display DIP3 (shown in FIG. 17) and thereby indicate the time and duration of events to be recorded on that day. Thus, the user can observe all the events preset for recording on a particular day by the planar distribution of preset event displays $K_{TOKU}$ on the horizontally and vertically arranged time zones. The distinction between event recording parameters included in the management data base and normal preset event recording parameters is also displayed.

Display of Day Display DIP3 continues until the user selects "UNDO" therefrom. This selection is detected by inquiry SP142, whereupon the CPU proceeds to inquiry SP143 from which the CPU returns to its previous display, i.e. the display from which the present Day Display was launched (in the present example, the CPU returns to the Calendar Display).

If inquiry SP140 determines that no event had been preset for recording in the selected day, the CPU displays the message "THERE IS NO PRESET PROGRAM FOR THE DAY" in step SP144, and then advances to inquiry SP143.

Let it be assumed that the user selects one of the week items, from the Calendar Display, e.g. "FIRST WEEK", "SECOND WEEK", . . . "FIFTH WEEK", in step SP136. The CPU detects this selection in inquiry SP137 and then determines in inquiry SP145 (FIG. 18B) whether or not there exists at least one event whose recording parameters had been preset for this selected week. If the answer is affirmative, the CPU advances to instruction SP146 to display Week Display DIP2 shown in FIG. 16, whereby the event preset state for the week is displayed. Thus, the user is provided with a graphic display of the distribution of events that had been preset for the desired week and may easily observe the recording times and durations for which the events are preset.

If no event had been preset for the selected week, the CPU displays the message "THERE EXISTS NO PROGRAM PRESET FOR THE WEEK" in step SP149 (FIG. 18A) and then proceeds to inquiry SP150.

The Week Display produced in step SP146 when the user selected one of the week items, as aforementioned, continues until the user selects a day item or "RETURN" from the display of FIG. 16 while the CPU cycles through the loop made up of step SP146 and inquiries SP147, SP148. If a day item is selected, inquiry SP147 is answered in the affirmative and the CPU advances to step SP141 via inquiry SP140 to display the Day Display of FIG. 17 and thereby display the event presetting state for the day selected by the user.

If the user selects "RETURN", from the Week Display, inquiry SP148 is answered in the affirmative and the CPU proceeds to inquiry SP143 and terminates the Week Display.

The foregoing description has assumed selection by the user of the item "CALENDAR" from the displayed Table TBL of FIG. 11 while the CPU cycles through the loop made up of inquiries SP132, SP133, SP134 and instruction SP131. If the user selects the item "MONTH" or "DAY" from the displayed Table TBL together with a numerical item, e.g. "0" to "12" for a month and "1" to "7" for a day, inquiry SP133 or inquiry SP134 is answered in the affirmative.

For example, if the user selects "MONTH" and a numeral 1, 2, 3, . . . 12 from the Table Display of FIG. 11, inquiry SP133 is answered in the affirmative and CPU 8 displays the Calendar Display of FIG. 15 for the selected month (e.g. month 1, month 2, etc.) in step SP151. Thereafter, the CPU advances to step SP136 to continue with the above-described subroutine. The calendar displayed in response to instruction SP151 is the complete calendar for the selected month and differs from the calendar of FIG. 15 which displays one month from the present day.

If the user selects a particular day from Table TBL shown in FIG. 11, inquiry SP134 is answered in the affirmative and the CPU then goes to inquiry SP140 (FIG. 18B) and then to step SP141 to display the Day Display for the selected day if events had been preset for that day.

Thus, if the user selects "CALENDAR", "MONTH" or "DAY" from the displayed Table TBL, the CPU 8 displays the event presetting status in tabulated form in the display mode corresponding to the selection. If the user selects "RETURN" from the Week Display shown in FIG. 16 or "UNDO" from the Day Display shown in FIG. 17 after observing the status of events that had been preset for recording that week or that day, inquiry SP142 or SP148 is answered in the affirmative and then inquiries SP143 and/or SP155 are answered to return the display to that preset Week or Day Display (i.e. the CPU returns to its previous display mode). That is, the CPU determines from inquiries SP143 and SP155 whether the condition from which it launched the present display was the Week Display (FIG. 16), the Day Display (FIG. 17), or the Month Display (FIG. 15). If the answer to inquiry SP143 is "WEEK", the CPU returns to step SP146 whereby the Week Display (FIG. 16) is displayed. If the answer to inquiry SP143 is "DAY DISPLAY", the CPU returns to step SP131 to display the Table TBL (FIG. 11). If the answer to inquiry SP155 is "CALENDAR", the CPU returns to step SP135 to display the Calendar Display (FIG. 15). If the answer to inquiry SP155 is "MONTH DISPLAY", the CPU returns to step SP151 to display the Calendar Display (FIG. 15) for the selected month.

If inquiry SP145 determines that no events have been preset for the selected week, the CPU displays, at step SP149, the message "THERE EXISTS NO PROGRAM PRESET FOR THE WEEK" and determines in inquiry SP150 whether the month item was selected from the "CALENDAR", display or the "MONTH" display. If the answer is "CALENDAR", the CPU returns to step SP135 to display the original calendar (FIG. 15). If the answer is "MONTH" the CPU returns to step SP151 to display the selected month.

Thus, the user is provided with a graphic display of Calendar Display (FIG. 15), Week Display (FIG. 16) or Day Display (FIG. 17) at his selection, from which he may observe in tabulated form the status of preset events during the selected period. This permits the user to easily and reliably preset and check the programming circuitry to record desired events.

The foregoing has described the operation and displays of the "TIMER SETTING" subroutine of step SP81 of FIG. 7B. However, the same operation and displays are obtained if the "MANAGEMENT DATA PRESETTING" subroutine RT3 of FIG. 8B is initiated by the user.

Figure 19A:
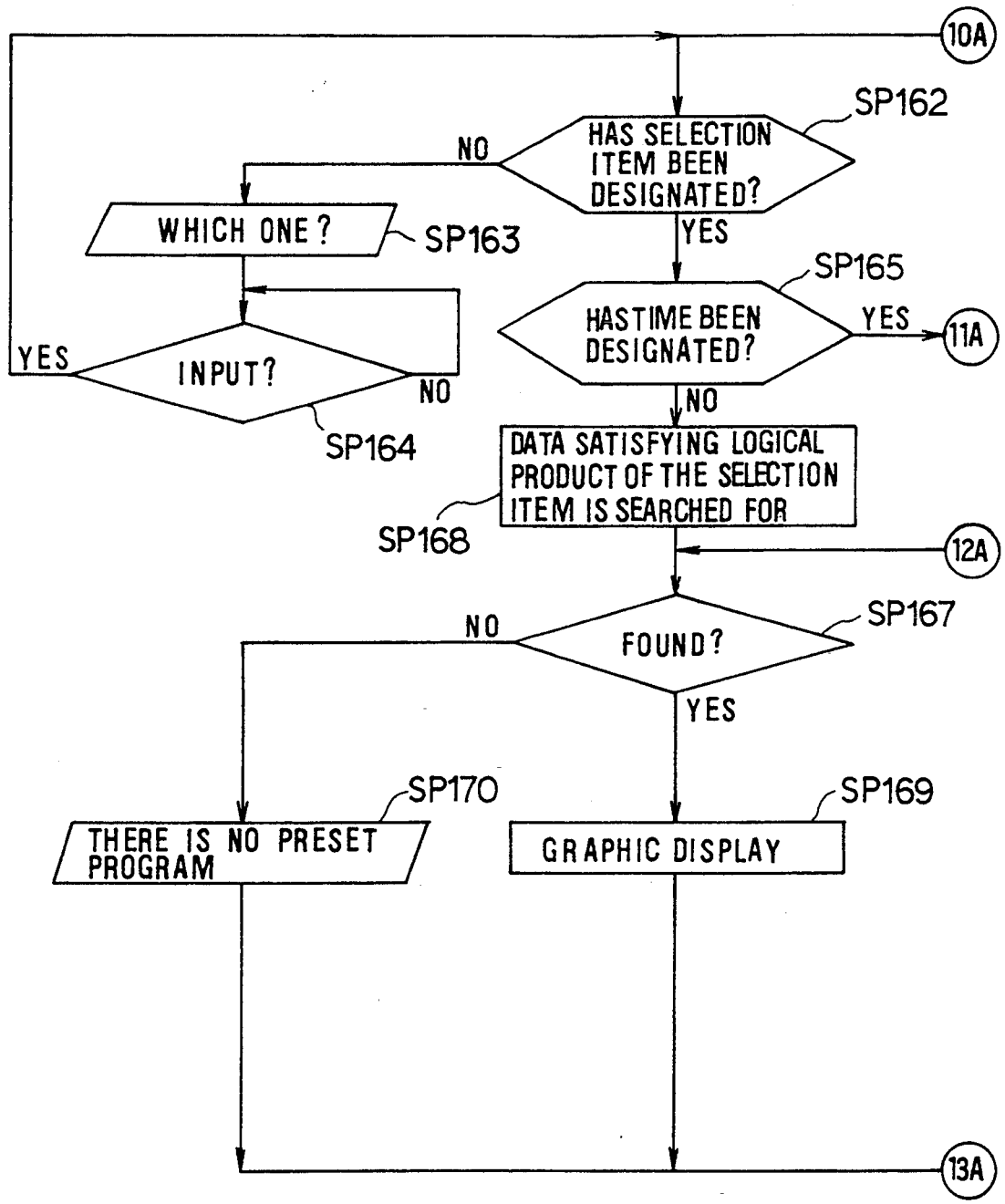
FIGS. 19A–19C comprise a flow chart of the manner in which preset data is displayed, changed or canceled.

Let it now be assumed that during the display of Table TBL in FIG. 11 while the CPU executes the MANAGEMENT DATA PRESETTING subroutine RT3, the user selects the item "DISPLAY", "CHANGE" or "CANCEL". As a result, CPU 8 jumps to the display, change or cancellation subroutine RT11 shown in FIG. 19B. In this subroutine the CPU initially determines at SP161 whether the user has selected "DISPLAY", "CHANGE" or "CANCEL". If "DISPLAY" is selected, inquiry SP162 (FIG. 19A) is made to determine if the user also has selected a selection item. In the preferred embodiment, examples of selection items include items which represent data relating to the date on which an event is to be recorded, such as "MONTH", "DAY" or "WEEK"; data relating to the source of an event to be recorded, such as "ch", "LINE", "CABLE" or "BS"; and data relating to the starting and/or ending time for an event to be recorded, such as "FROM A CERTAIN O'CLOCK AND A CERTAIN MINUTE" or "TO A CERTAIN O'CLOCK AND A CERTAIN MINUTE".

If a selection item has not been selected, the answer to inquiry SP162 is negative and the CPU displays a message, such as "WHICH ONE" (step SP163) to prompt the entry of a selection item from the user. The CPU waits for a response from the user by cycling through inquiry SP164. When a response is received, inquiries SP164 and SP162 both are answered in the affirmative and the CPU goes to step SP165 to determine if time-representing data has been selected. If inquiry SP165 is answered in the affirmative, the CPU searches in step SP166 for management data which satisfies the selected criteria of the selection item within a given time range defined by the input time-representing data; and then proceeds to inquiry SP167 to determine if the time-representing data within that range has been found. If inquiry SP165 is answered in the negative, that is, if time-representing data has not been input by the user, the CPU searches in step SP168 for data which satisfies the selected selection item over an entire time range, and then advances to inquiry SP167. Inquiry SP167 determines whether or not the events having the selected selection item as well as recording start or recording end times which match the time-representing data selected by the user have been found. If the answer is affirmative, the CPU advances to instruction SP169 to display in table form (FIG. 20) HYO those preset events that were found. However, if the answer to inquiry SP167 is negative, the CPU advances to instruction SP170 to display a message, such as, "THERE IS NO PRESET PROGRAM". The display of FIG. 20 provides the user with an indication of those events which have been selected for recording within user-entered time constraints.

Figure 20:
FIG. 20 shows a graphic display produced by the routine of FIGS. 19A–19C in response to user selection of particular preset data items.

After executing the display of step SP169 or SP170, the CPU cycles through inquiry SP171 until the item of FIG. 20 is selected by the user, whereafter the CPU returns at SP172 to the "MANAGEMENT DATA PRESETTING" subroutine RTS shown in FIG. 8.

Let it be assumed that inquiry SP161 senses that the user has selected "CHANGE" or "CANCEL" from Table TBL. The CPU inquires at SP173 whether or not a selection item has been selected (similar to that discussed above in conjunction with inquiry SP162). If the answer is negative, the CPU displays the message "WHICH ONE ?" in step SP174 to prompt the entry of a selection item from the user. The CPU waits for a user response by cycling through inquiry SP175. When the user inputs a selection item, the CPU advances to inquiry SP176 via inquiry SP173 to determine whether or not time-representing data has been entered (similar to aforedescribed inquiry SP165). If so, the CPU searches in step SP177 for data which satisfies the selection item and which contains time-representing data within a given time range defined by the entered time-representing data. Inquiry SP178 is made to determine if such data has been found. If the answer to this inquiry is affirmative, data relating to the preset events that have been found are changed or canceled in step SP179, consistent with the selection from Table TBL, and the CPU then returns to the "MANAGEMENT DATA PRESETTING" subroutine RT3 of FIG. 8 via SP171 and SP172.

Changes are effected, or cancellation of an event is made in step SP179 on one preset event at a time in order to prevent erroneous or inadvertent deletion or modification of an event.

If the answer to inquiry SP178 is negative, the CPU displays a message such as "THE OBJECTIVE PROGRAM CANNOT BE FOUND" in step SP180 (meaning that events having the user-entered criteria are not found), and then returns to the "MANAGEMENT DATA PRESETTING" subroutine RT3 of FIG. 8.

If time-representing data has not been entered by the user, inquiry SP176 is answered in the negative and the CPU searches, in step SP181, for data that satisfies the other parameters entered by the user (e.g. channel, type, etc.), but without regard to a limited time range. Thereafter, the CPU determines at inquiry SP182 whether or not preset events having these parameters have been found. If the answer is affirmative, inquiry SP183 determines whether more than one event has been found. If not, the event which has been found is changed or canceled in step SP179. But, if the answer to inquiry SP183 is affirmative, CPU 8 displays a message at step SP184, e.g. "WHICH ONE ?" which prompts user-selection of one of these plural events, and then cycles through inquiry SP185 awaiting the input of time-representing data. Once time-representing data is entered, inquiry SP185 is answered in the affirmative and the CPU returns to step SP177 to execute once again a search for the preset events which satisfy the selected selection item and which contain time-representing data within the given time range.

If events with the parameters entered by the user cannot be found, the answer to inquiry SP182 is negative and the CPU displays the message "THE OBJECTIVE PROGRAM CANNOT BE FOUND" in step SP186. The illustrated subroutine then proceeds to inquiry SP171.

Figure 19B:
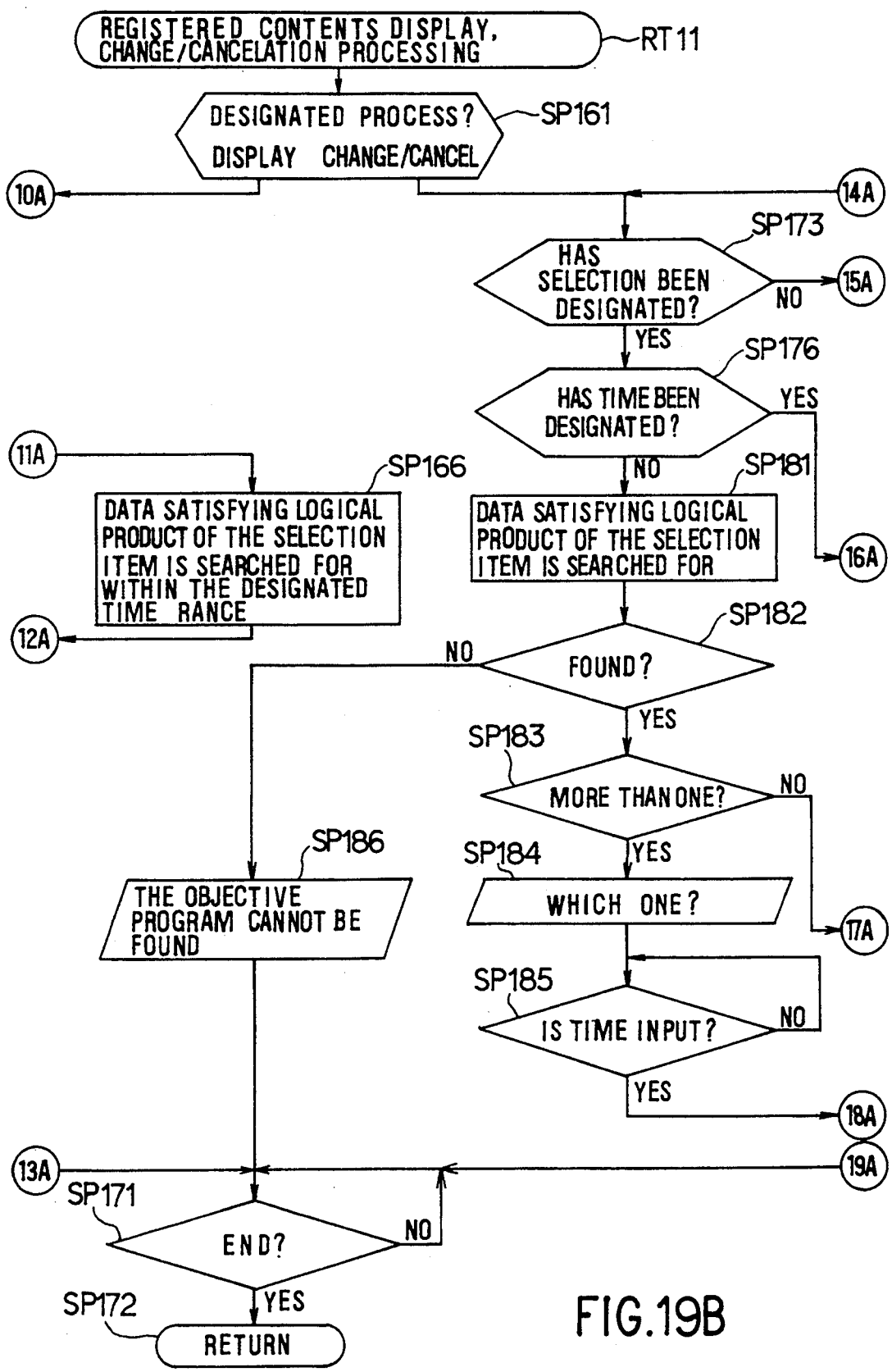
Figure 19C:
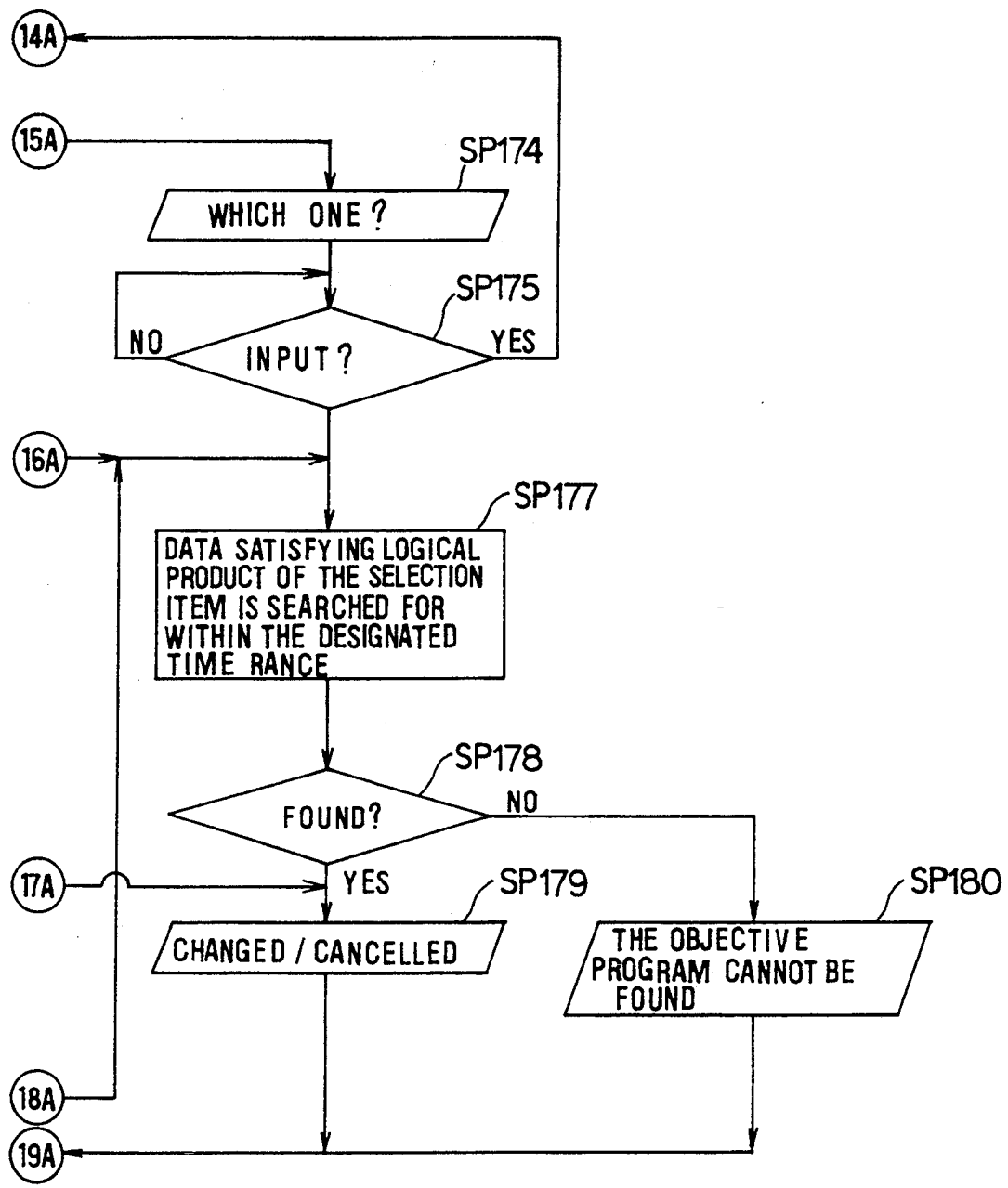
Figure 21:
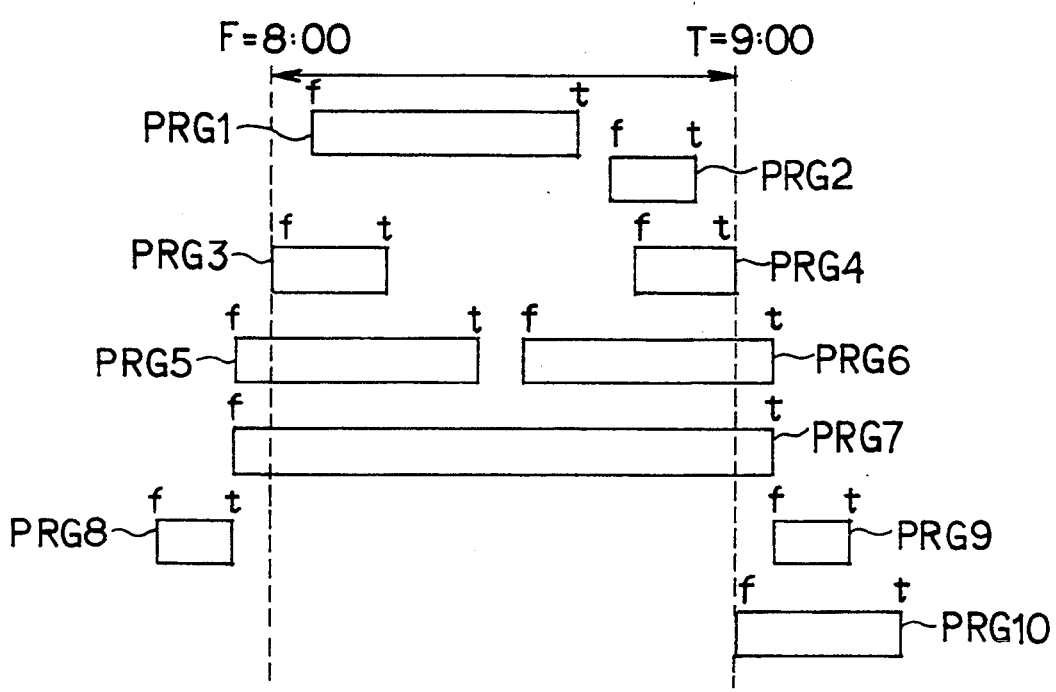
FIGS. 21 and 22 are schematic diagrams which are useful in understanding the routine of FIGS. 19A–19C.

The execution of instruction SP166 of FIG. 19B (or instruction SP177 of FIG. 19C) is best explained by an example. Time-representing data may be a range between two respective hours in a day representing events that are to be recorded at any time within that range and, as mentioned above, the selection item may be a source or type of event. For example, the selection item may represent a particular source (e.g. channel 8 or BS, etc.) or type of event (e.g. sports, news, drama, etc.) and the desired range may be 8 o'clock to 9 o'clock. FIG. 21 illustrates this time range of, for example, "FROM 8 O'CLOCK to 9 O'CLOCK" and also illustrates those events that have been preset and which exhibit recording times that fall within this range or are proximate thereto. More particularly, let it be assumed that preset events are provided with recording starting times $f$ and recording ending times $t$. If the desired time range extends from $F=8:00$ to $T=9:00$, then FIG. 21 illustrates those preset events which satisfy the conditions of $$F \leq f \text{ and } t \leq T \quad (1)$$

namely, events PRG1, PRG2, PRG3 and PRG4. In addition, those events which satisfy the conditions of $$F \geq f, t < T \text{ and } F < t \quad (2)$$

such as the event PRG5 are illustrated. FIG. 21 also illustrates those events which satisfy the conditions of $$F \leq f, t \geq T \text{ and } T > f \quad (3)$$

namely, event PRG6. Finally, those events which satisfy the conditions of $$F \geq f \text{ and } t \geq T \quad (4)$$

such as event PRG7, are illustrated. Hence, FIG. 21 schematically represents those events having at least a portion recorded in the range $F \rightarrow T$.

Figure 22:
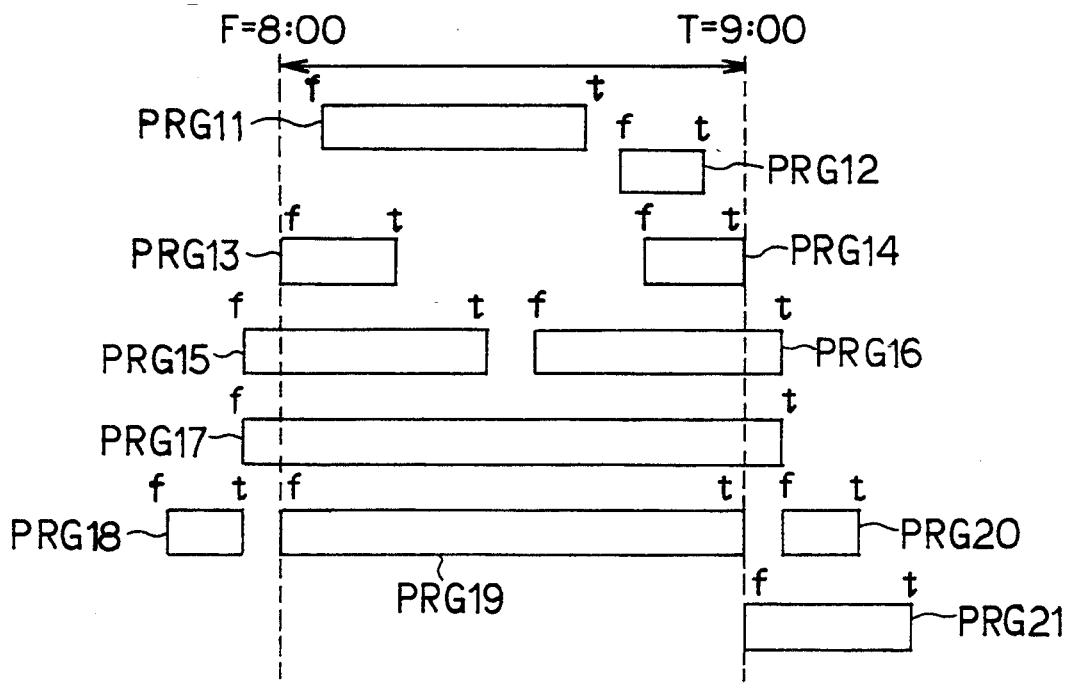

As another example, let it be assumed that the user wishes to find preset events that have recording start times of 8:00 and preset events that have recording end times at 9:00. FIG. 22 illustrates those events which have at least a portion to be recorded between 8 o'clock and 9 o'clock, as well as other preset events having recording times in the vicinity of this range. Those preset events which satisfy the user's search parameters include those which satisfy the conditions $$F = f \text{ or } t = T \quad (5)$$

(that is, one or the other, but not both of these conditions are satisfied) such as events PRG13 and PRG14, and those which satisfy the conditions $$F = f \text{ and } t = T \quad (6)$$

such as event PRG19.

In the subroutine shown in FIG. 19, designation of selection items by the user enables only those preset events which satisfy the criteria represented by those selection items to be displayed. Hence, only those preset events (or events which have already been recorded) in which the user is interested are displayed. This makes it easier to display and check only certain events. A preferred display format for these events is shown as table HYO in FIG. 20 in which a plurality (e.g. four) of preset events is listed on respective lines. In the illustrated example, the selection items chosen by the user are "MONDAY", "FROM 9 PM to 9:57 PM" and "8 ch"; and it is assumed that the present time of day is 10:15 on Friday, Sep. 15. Table HYO thus represents those events that have already been recorded (line 1) and those which have been preset for recording on subsequent Mondays (lines 2–4). For example, the status of a weekly series television program is easily displayed merely by selecting desired selection items relating to that series, such as the day of the week, time and channel of that program.

In addition to displaying the preset time of an event to be recorded, the time at which an event has already been recorded and the input source of each selected event, the contents of the management data are displayed as icons at the right end portion of each row in the table shown in FIG. 20. This facilitates a recognition by the user of the data relating to those events that have been preset or recorded.

In the above-described embodiment, table HYO is displayed during the "MANAGEMENT DATA PRESETTING" subroutine of FIGS. 7 and 8. However, this table and the data contained therein may be displayed when the timer on the video tape recorder unit 3 is preset directly by the user, as represented by the "TIMER SETTING" subroutine of step SP81 (FIG. 7B) (that is, when management data is not recorded or played back from the video tape).

While the present invention has been particularly described in connection with a preferred embodiment, it will be readily apparent to those of ordinary skill in the art that various changes and modifications may be made without departing from the spirit and scope of the invention. For example, the management data base may be recorded in recording area $F_{AVV}$ in the video tracks or in recording area $F_{AVA}$ in the audio tracks, or both. As another example, although it has been discussed that data is entered by the user by selecting items displayed in Table TB6, input data may be derived from other displays, such as symbols, graphic characters, icons, or the like. Still further, the present invention is not limited for use only with video recorders. It is expected that the programming of an audio recorder or other data recorder to record events at particular times also may be carried out in accordance with the present invention.

It is intended that the appended claims be interpreted to cover the specific embodiments described herein, the alternatives mentioned above and all equivalents thereto.

What is claimed is:

1. Apparatus for recording on and reproducing from a record medium event signals supplied at particular times from at least one source as well as preset data selectively input by a user which data establishes an event signal to be recorded and the time of recording that event signal, said apparatus comprising: data input means for selectively producing preset data to select source, time and duration of event signals to be recorded on said record medium; temporary storage means operatively coupled to said data input means for storing said preset data produced by said data input means for recording on said record medium and for storing preset data reproduced from said record medium; display means connected to display preset data stored in said storage means; and control means operatively coupled to said display means, said data input means and said temporary storage means for controlling said display means to display on a first time zone preset data representing time and duration of event signals which have already been selected for recording ("already preset data") and also to display on a second time zone preset data representing time and duration of event signals which are in the process of being selected for recording ("currently preset data"), said first and second time zones being aligned to display temporal overlaps between the already preset data and the currently preset data.

2. The apparatus of claim 1, wherein said preset data includes broadcast channel, time-of-day of recording and day-of week of recording of an event.

3. The apparatus of claim 2 wherein said first and second time zones comprise first and second horizontal scales, respectively, each representing predetermined times in a given day and being displayed on said display means one above the other.

4. The apparatus of claim 3 wherein the preset data displayed on said first and second time zones comprise indicia superimposed on a respective time zone at a location corresponding to the time of recording, said indicia exhibiting a horizontal dimension representing the duration of recording.

5. The apparatus of claim 4 wherein said control means includes sensing means for sensing when a start recording time of an event represented by one of said already and currently preset data begins prior to an end recording time of an event represented by the other of said currently and already preset data for a particular day.

6. The apparatus of claim 5 wherein said control means further includes detecting means for detecting when the end recording time of an event represented by one of said already and currently preset data is within a predetermined range of the start recording time of an event represented by the other of said currently and already preset data.

7. The apparatus of claim 6 wherein said control means additionally includes time changing means responsive to one of said sensing means and said detecting means for selectively changing a selected one of the start and end recording times of the event represented by said currently preset data.

8. The apparatus of claim 7 wherein said control means further includes cancel means for canceling a selected one of said already or currently preset data, thereby canceling the recording of a corresponding event.

9. The apparatus of claim 2 wherein said record medium comprises a video recording medium having video signals representing an event recorded in video tracks thereon, and further including recording circuitry for receiving preset data from said storage means for recording said preset data in a predetermined location in said video tracks.

10. Apparatus for recording on and reproducing from a record medium events supplied at particular times from at least one source as well as preset data selectively input by a user which data establishes an event to be recorded and the time of recording that event, said apparatus comprising: data input means for selectively producing preset data to select source, time and duration of events to be recorded on said record medium; temporary storage means operatively coupled to said data input means for storing the preset data produced by said data input means for recording on said record medium and for storing preset data reproduced from said record medium; display means for displaying preset data stored in said storage means; and control means operatively coupled to said display means, said data input means and said temporary storage means for controlling said display means to display preset data associated with plural events in a two-dimensional display array comprised of first and second time zones aligned in horizontal and vertical directions, respectively, thereby displaying graphical indications along one of said time zones of the recording time and duration of events selected for recording.

11. The apparatus of claim 10 wherein said first time zone represents days of a week and said second time zone represents a number of successive weeks, whereby said display means displays a calendar of events selected for recording.

12. The apparatus of claim 11 further comprising input selection means operable by the user to select a week-of-events display; and wherein said control means includes sensing means for sensing when a week-of-events display has been selected to control said display means to display hours of a day in said first time zone and the days of a selected week in said second time zone, whereby a week of events, including the recording times and durations of events selected for recording in each day of the selected week, is displayed.

13. The apparatus of claim 12 further comprising day selection means operable by the user to select a day-of-events display; and wherein said control means further includes detecting means for detecting when a day-of-events display has been selected to control said display means to display hours of a day in said first time zone and A.M. and P.M. of a selected day in said second time zone, whereby a day of events, including the recording times and durations of events selected for recording in the selected day, is displayed.

14. The apparatus of claim 13 wherein the displayed calendar of events includes indicia to prompt the user to operate a selected one of said input selection means and said day selection means to select a selected one of a week-of-events display and a day-of-events display, respectively.

15. The apparatus of claim 14 wherein the week-of-events display includes indicia to prompt the user to operate said day selection means to select a day-of-events display.

16. The apparatus of claim 14 wherein said control means includes search means for searching for preset data representing an event to be recorded in the selected week and to return said display means to the calendar of events display if preset data representing an event to be recorded in the selected week is not found.

17. The apparatus of claim 16 wherein said search means includes means for searching the stored preset data in response to a day-of-events selection for preset data representing an event to be recorded in the selected day; and said control means additionally includes means for returning said display means to said calendar of events display or to said week of events display, depending upon the display from which the user selected said day-of-events display, if preset data representing an event to be recorded in the selected day is not found.

18. The apparatus of claim 10 wherein said control means includes means for determining from which of said data input means and said record medium the preset data in said storage means is derived; and means for causing said display means to display distinguishable indications in response to stored preset data that is produced by said input means and stored preset data that is reproduced from said record medium.

19. Apparatus for recording on and reproducing from a record medium events supplied at particular times from at least one source as well as preset data selectively input by a user which data establishes an event to be recorded and the time of recording that event, said apparatus comprising: data input means for selectively producing preset data to select source, time and duration of events to be recorded on said record medium; temporary storage means operatively coupled to said data input means for storing the preset data produced by said data input means for recording on said record medium and for storing preset data reproduced from said record medium; display means for displaying preset data stored in said storage means; and control means operatively coupled to said data input means, said temporary storage means and said display means and responsive to select data produced by said data input means which represents particular information included in said preset data for retrieving from said storage means preset data having said particular information and for controlling said display means to display the retrieved preset data in tabulated form.

20. The apparatus of claim 19 wherein said particular information represents a day of a week, and the retrieved preset data identifies events to be recorded on that day for plural weeks.

21. The apparatus of claim 20 wherein said particular information represents a source of events, and the retrieved preset data identifies events to be recorded from that source.

22. The apparatus of claim 20 wherein said particular information additionally represents a range of time, and the retrieved preset data identifies events to be recorded on that day within said range of time.

23. The apparatus of claim 19 wherein said particular information represents a day of a week, a range of time and a source of events, and the retrieved preset data identifies events to be recorded on that day each week for plural weeks, within said range of time and from that source.

24. The apparatus of claim 19 wherein said control means includes sensing means for sensing the absence of said select data to inhibit the tabulated display of retrieved preset data.

25. The apparatus of claim 19 wherein said data input means includes change means manually operable by the user to change at least portions of retrieved preset data; and wherein said control means is responsive to said change means for changing portions of preset data retrieved from said storage means and having said particular information.

26. The apparatus of claim 25 wherein said control means includes detecting means for detecting when plural preset data having said particular information are retrieved from said storage means and are to be changed, and means responsive to said detecting means for causing said display means to display prompts inviting additional select data to be produced for identifying a desired one of said plural preset data.

27. Apparatus for recording on and reproducing from a record medium events supplied at particular times from at least one source as well as preset data selectively input by a user which data establishes an event to be recorded and the time of recording that event, said apparatus comprising: data input means for selectively producing preset data to select source, time and duration of events to be recorded on said record medium; temporary storage means operatively coupled to said data input means for storing the preset data produced by said data input means for recording on said record medium and for storing preset data reproduced from said record medium; display means for displaying in a predetermined format preset data stored in said storage means; format selecting means manually operable for selecting one of plural display formats; and display control means operatively coupled to said data input means, said temporary storage means, said format selecting means and said display means and responsive to a predetermined format selection for displaying a one-month calendar formed of portions of successive months and indicating thereon events that have been selected for recording by said user.

28. The apparatus of claim 27 wherein said portions of successive months comprise indicia of days of each of two successive months.

29. The apparatus of claim 28 wherein said indicia of days comprise those days included in a present month, commencing with the day which then is present, and at least a portion of those days which are included in the next following month.

30. The apparatus of claim 29 wherein each indicia of a day is provided with an index scale representative of time; and wherein said display control means includes means for displaying on said index scale the approximate duration of an event to be recorded and the approximate time of recording that event.

* * * * *